(12) United States Patent
Boston et al.

(10) Patent No.: US 12,551,674 B2
(45) Date of Patent: Feb. 17, 2026

(54) REPOSITIONABLE SURGICAL TAMPON

(71) Applicant: The Government of the United States, as represented by The Director of the Defense Health Agency, Fort Detrick, MD (US)

(72) Inventors: Andrew Boston, Silver Spring, MD (US); Mostafa Ahmed, Silver Spring, MD (US)

(73) Assignee: The Government of the United States, as represented by The Director of the Defense Health Agency, Fort Detrick, MD (US)

( * ) Notice: Subject to any disclaimer, the term of this patent is extended or adjusted under 35 U.S.C. 154(b) by 449 days.

(21) Appl. No.: 17/954,462

(22) Filed: Sep. 28, 2022

(65) Prior Publication Data

US 2024/0074918 A1   Mar. 7, 2024

Related U.S. Application Data

(60) Provisional application No. 63/374,615, filed on Sep. 6, 2022.

(51) Int. Cl.
*A61F 13/26* (2006.01)
*A61B 17/34* (2006.01)
(Continued)

(52) U.S. Cl.
CPC ....... *A61M 31/002* (2013.01); *A61B 17/3417* (2013.01); *A61F 13/2002* (2013.01); *A61F 13/2005* (2013.01); *A61F 13/2074* (2013.01); *A61F 13/2077* (2013.01); *A61F 13/266* (2013.01); *A61F 13/34* (2013.01);
(Continued)

(58) Field of Classification Search
CPC .............. A61F 13/2002; A61F 13/2005; A61F 13/2074; A61F 13/2025; A61F 13/2028; A61F 13/34; A61F 13/2077; A61F 13/26; A61F 13/36; A61M 31/002;
(Continued)

(56) References Cited

U.S. PATENT DOCUMENTS

| 4,338,941 A | 7/1982 | Payton |
| 4,950,280 A | 8/1990 | Brennan |

(Continued)

FOREIGN PATENT DOCUMENTS

WO   2021257506 A1   12/2021

OTHER PUBLICATIONS

Boston AG, "A Novel Endoscopic Technique for Failed Nasogastric Tube Placement," Otolaryngol Head Neck Surg., Oct. 2015;153(4), pp. 685-687. doi: 10.1177/0194599815588914.

*Primary Examiner* — Susan S Su
(74) *Attorney, Agent, or Firm* — Leveque IP Law, P.C.

(57) ABSTRACT

A conformable surgical tampon for disposition into and removal from an anatomical cavity of a mammalian patient by a doctor to absorb and collect bodily fluids. The tampon comprises an absorbent chassis material and a plurality of spaced apart positioning strings attached to the chassis. The spaced apart positioning strings are operative to selectively position the conformable nasopharyngeal tampon within an anatomical cavity of a patient responsive to manipulation of a positioning string by a surgeon. The tampon is particularly suited for nasopharyngeal surgery.

22 Claims, 16 Drawing Sheets

(51) Int. Cl.
*A61F 13/20* (2006.01)
*A61F 13/34* (2006.01)
*A61L 15/20* (2006.01)
*A61L 15/42* (2006.01)
*A61L 15/58* (2006.01)
*A61L 15/60* (2006.01)
*A61M 31/00* (2006.01)
*A61M 35/00* (2006.01)
*A61B 17/00* (2006.01)

(52) U.S. Cl.
CPC ............... *A61L 15/20* (2013.01); *A61L 15/42* (2013.01); *A61L 15/58* (2013.01); *A61L 15/60* (2013.01); *A61M 35/006* (2013.01); *A61B 2017/00238* (2013.01); *A61F 2013/2014* (2013.01); *A61M 2210/0618* (2013.01)

(58) Field of Classification Search
CPC ............ A61M 35/006; A61M 31/007; A61B 17/3417; A61L 15/20; A61L 15/42; A61L 15/60
See application file for complete search history.

(56) References Cited

U.S. PATENT DOCUMENTS

| | | | |
|---|---|---|---|
| 5,391,179 A | 2/1995 | Mexzzoli | |
| 5,584,827 A * | 12/1996 | Korteweg | A61F 13/126 604/11 |
| 5,658,084 A | 8/1997 | Wirt | |
| 6,183,436 B1 * | 2/2001 | Korteweg | A61F 13/2051 604/385.18 |
| 6,478,191 B1 | 11/2002 | D'Alessio et al. | |
| 7,516,872 B2 | 4/2009 | Boone et al. | |
| 8,172,828 B2 | 5/2012 | Chang et al. | |
| 10,154,815 B2 | 12/2018 | Al-Ali et al. | |
| 2004/0019316 A1 | 1/2004 | Morris et al. | |
| 2006/0247568 A1 | 11/2006 | Stenton | |
| 2009/0227930 A1 * | 9/2009 | Crisp | A61K 8/27 604/93.01 |
| 2012/0071712 A1 | 3/2012 | Manwaring et al. | |
| 2012/0071717 A1 | 3/2012 | Manwaring et al. | |
| 2012/0191129 A1 | 7/2012 | Kerber | |
| 2013/0019872 A1 | 1/2013 | Guyoron et al. | |
| 2013/0066298 A1 | 3/2013 | Deeds | |
| 2013/0131720 A1 | 5/2013 | Quintero et al. | |
| 2013/0327326 A1 * | 12/2013 | Brennan | A61M 1/88 128/202.16 |
| 2021/0267813 A1 * | 9/2021 | Wales | A61F 13/266 |

* cited by examiner

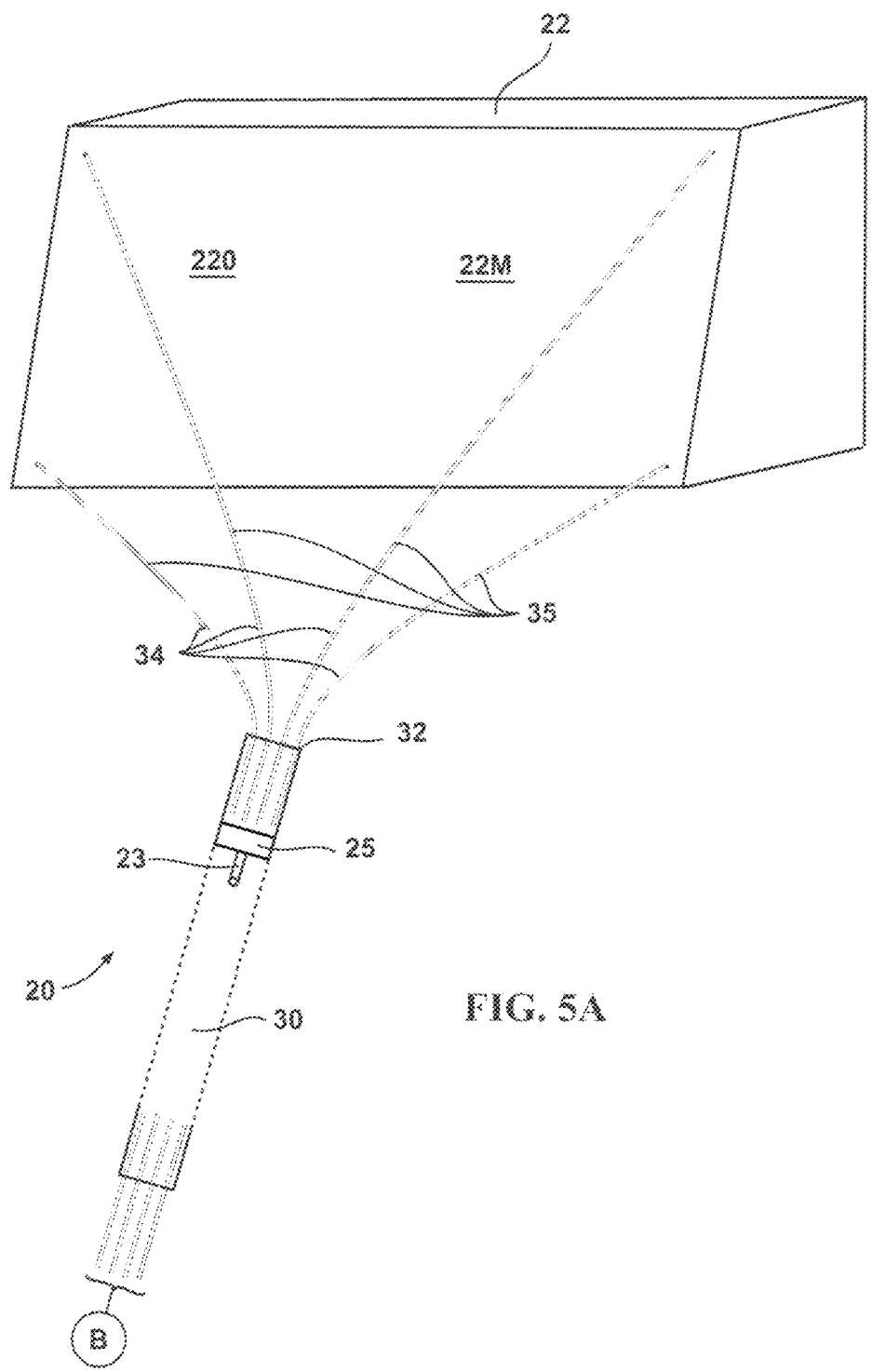

| Functional Additive | Benefit |
|---|---|
| Medication 230 | Healing, Patient comfort |
| AGM/SAP 240 | Hemostasis |
| Luminescent material 260 | Patient safety |
| Exothermic/endothermic material 280 | Patient safety |
| Blood soluble adhesive 300 | Patient comfort, Hemostasis |
| Pulse oximeter 320 | Patient safety |

REPOSITIONABLE SURGICAL TAMPON

CROSS REFERENCE TO RELATED APPLICATION

This application claims priority to and the benefit of provisional patent application 63/374,615 filed Sep. 6, 2022, the disclosure of which is incorporated herein by reference.

STATEMENT OF GOVERNMENT INTEREST

The invention described and claimed herein may be manufactured, licensed and used by or for the Government of the United States of America for all government purposes without the payment of any royalty.

FIELD OF THE INVENTION

This application relates to a surgical tampon for use in an anatomical cavity of a patient during a surgical procedure and more particularly to a nasopharyngeal surgical tampon which is repositionable within the anatomical cavity of the patient during surgery without using external surgical instruments.

BACKGROUND OF THE INVENTION

Chronic rhinosinusitis can have significant effects on health and quality of life, and can be as disabling as angina, congestive heart failure and back pain. Millions of Americans suffer with chronic rhinosinusitis, with more than 500,000 sinus surgeries being performed every year. A typical surgery is Functional Endoscopic Sinus Surgery (FESS), although other sinus surgeries are often needed.

Surgery involving the sinus cavities, tonsils and middle ear are amongst the most common medical procedures in the United States. Each type of these procedures has fundamental challenges that can impact patient safety, outcomes and comfort. Each such procedure involves cavities in the patients' anatomies that can vary widely from patient to patient and even within different parts of the same patient's anatomy. Different bodily cavity sizes, shapes and depth call for different surgical tampons.

For example, nasal surgery is often performed under general anesthesia because there are no tools to prevent profuse nasal secretions from reaching the airway. Tonsillectomy surgery has a 5-10% risk of severe bleeding, which unfortunately can cause death. A tonsillectomy, removes the tonsils from the oropharynx and leaves a large scar bed which is at risk of post-operative bleeding for three to four weeks. Middle ear surgery has a high revision rate, about 20%, because of middle ear scar formation. Middle ear surgery, often uses gelfoam to support the reconstructive graft. The graft can cause severe scar formation, and hearing loss. The hearing loss, in turn, often requires revision surgery, often with suboptimal hearing results. And injury to the facial nerve and deafness increases with revision surgery.

Despite the millions of patients and ear, nose, throat surgeries which have occurred, challenges remain. For example, during nasal and sinus surgery, preventing drainage of blood or other fluids into the airway and preventing aspiration of blood or other fluids are desirable. There are devices that control intranasal bleeding and collect nasal secretions, blood, and/or irrigation fluid during sinonasal surgery or epistaxis in awake, sedated or anesthetized patients. These devices include a variety of forms of nasal packing, and are referred to as nasal tampons or intranasal balloons. These devices for controlling intranasal bleeding generally are of two major types, based on their positioning during use, including anterior devices and posterior devices. Posterior devices are generally placed in the nasopharynx, or in the general nasopharyngeal area of the patient. But, proper disposition in the nasopharynx is often difficult, requiring skillful manipulation by the doctor to install, position and subsequently remove these devices relative to the nasopharyngeal area of the patient. Anterior devices can be ineffective if the absorbent is not placed into direct contact with the source of the fluid, and are particularly ineffective in situations where the otorhinolaryngologist cannot identify the source of bleeding.

Attempts have been made to provide suitable nasopharyngeal tampons for the otorhinolaryngologist. For example, U.S. Pat. Nos. 4,338,941 and 5,391,179 disclose inflatable bags and shaped bodies which respond to airflow for surgery, respectively. US 2012/0071712 discloses a heated balloon catheter which requires an external power source. U.S. Pat. No. 8,172,828 discloses yet another balloon catheter. But each of these attempts rely upon complex operations which may distract the doctor from immediate patient care. For example, if airflow is too great, improper aspiration may occur. If air pressure is too low or too high, improper inflation may occur.

U.S. Pat. No. 4,950,280 teaches a tampon having a drainage conduit enveloped by an absorptive member, likely requiring extra suction to extract nasal hemorrhages therethrough. US 2004/0019316 teaches a nasal airway delivery decongestion system having a sponge which having a flat paddle-like shape. The sponge is said to expand in order to release a topical steroid to the local inferior turbinate mucosa. But expansion of the sponge may not dispose this sponge, or its steroid, in the proper position within the nasopharynx. US 2013/0019872 teaches an elliptical nasopharyngeal airway intended to provide a comfortable cannula. But if the cannula is not inserted in the proper orientation, even greater discomfort to the patient may result. The orientation may appear to be proper outside the nostril, but the cannula could be twisted inside the nasopharynx, and go unnoticed. Stryker ENT of Plymouth, MN sells XeroGel® dissolvable nasal packing containing PEG and chitosan. But this nasal packing has predetermined constituent percentages which may not be optimized for every patient.

Additionally, the patient may require additional medication or other treatment(s) during the surgery. For example, the surgeon may need more illumination at the point of the procedure, or may need local cooling for vasoconstriction. But if the surgeon is sidetracked by these needs, the procedure may be unduly prolonged.

Accordingly a new approach is needed for the hundreds of thousands of annual sinus surgeries. Particularly an approach is needed which provides a surgical tampon for patient treatment with convenience and flexibility for and minimizing distractions to the otolaryngologist or other otorhinolaryngologist.

SUMMARY OF THE INVENTION

In one embodiment the invention comprises a conformable surgical tampon for disposition into and removal from an anatomical cavity of a mammalian patient by a doctor to thereby absorb and collect bodily fluids, the tampon comprising: an absorbent chassis material and a plurality of spaced apart positioning strings attached to the chassis, wherein the positioning strings are operative to selectively position the conformable nasopharyngeal tampon within an anatomical cavity of a patient responsive to manipulation of a positioning string by a doctor.

BRIEF DESCRIPTION OF THE DRAWINGS

FIG. 5A and FIG. 5B are a common perspective view of a kit having an alternative embodiment of a tampon expelled from the deployment tub of an apparatus, and returned to an unconstrained volume and having plural positioning strings, with the apparatus being shown in sectional view taken along lines 1B-1B of FIG. 1A. It is to be understood that FIG. 5B is drawn in larger scale than FIG. 5A.

DETAILED DESCRIPTION OF THE INVENTION

It is understood that the components of the embodiments as generally described and illustrated herein, may be arranged and designed in a wide variety of different configurations in addition to the described nonlimiting exemplary embodiments. Thus, the following more detailed description of the example embodiments, as represented in the figures, is not intended to limit the scope of the embodiments, as claimed, but is merely representative of exemplary embodiments. The described features, structures, and/or characteristics may be combined in any suitable manner in one or more embodiments. One skilled in the art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain preferred embodiments.

Figure 1A:
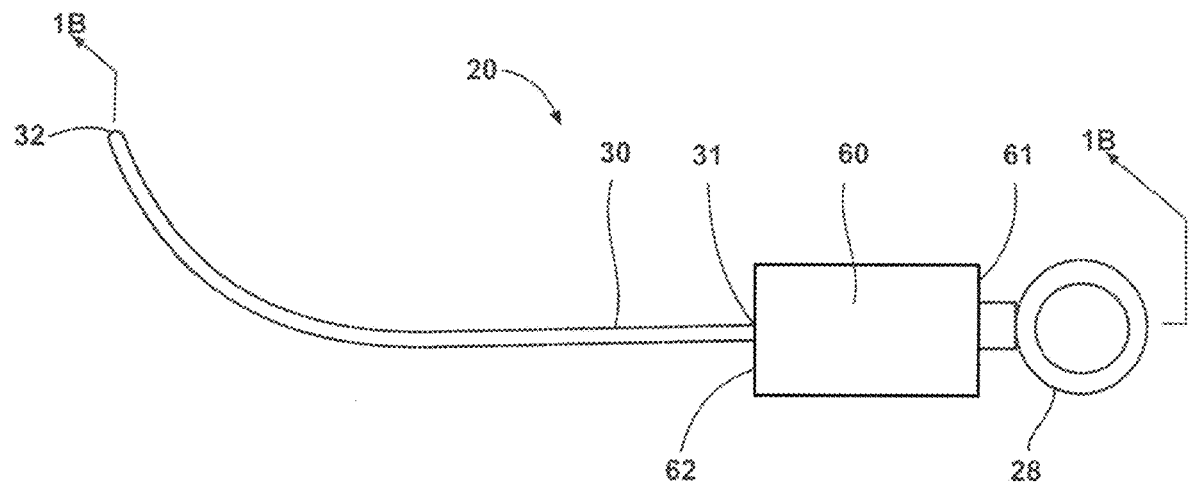
FIG. 1A is a side elevational view of an apparatus according to the present invention.
Figure 1B:
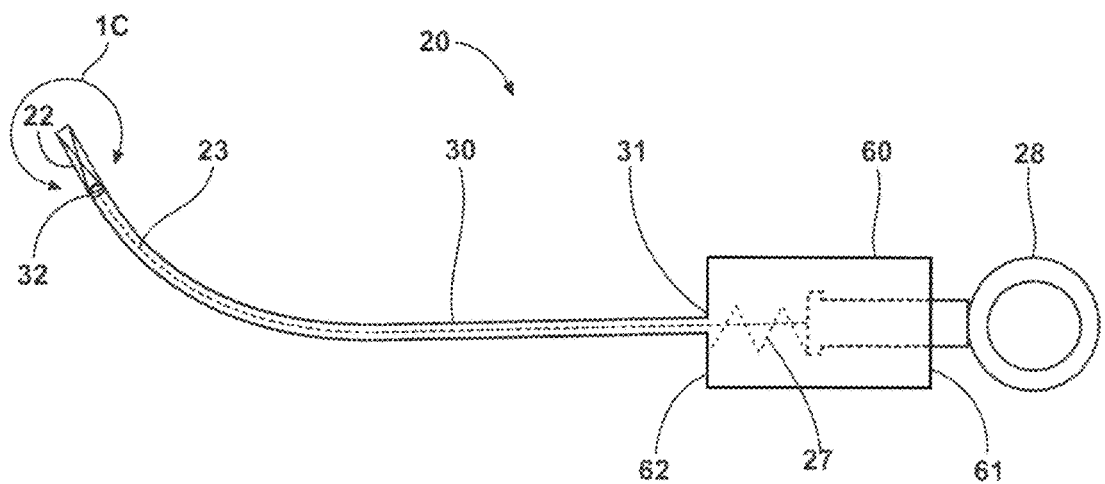
FIG. 1B is a sectional view taken along lines 1B-1B of FIG. 1A.
Figure 1C:
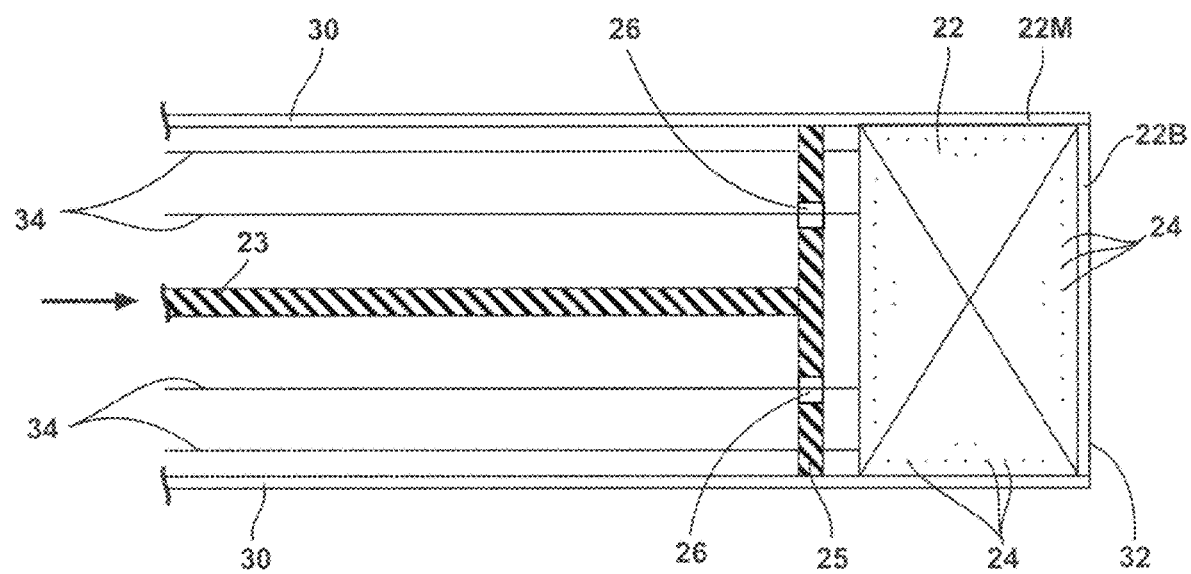
FIG. 1C is an enlarged sectional view taken from Circle 1C of FIG. 1B, with the forward, advance direction designated by the arrow and the retraction direction opposite the arrow.
Figure 1D:
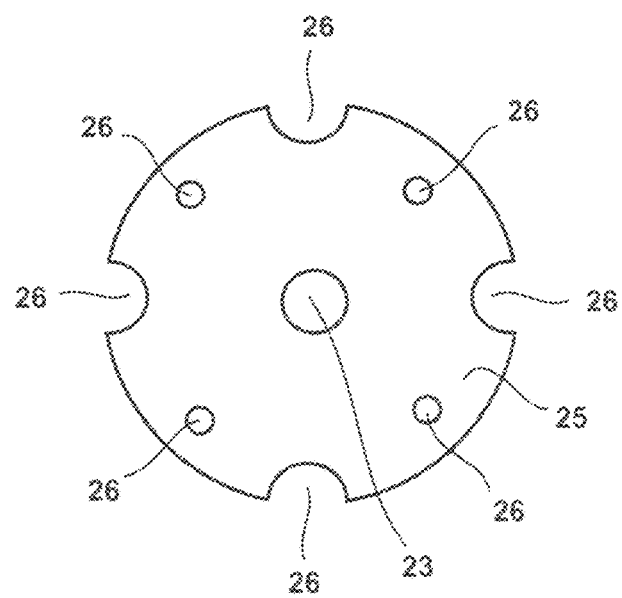
FIG. 1D is a frontal view of the plunger and plate of FIG. 2C.
Figure 2A:
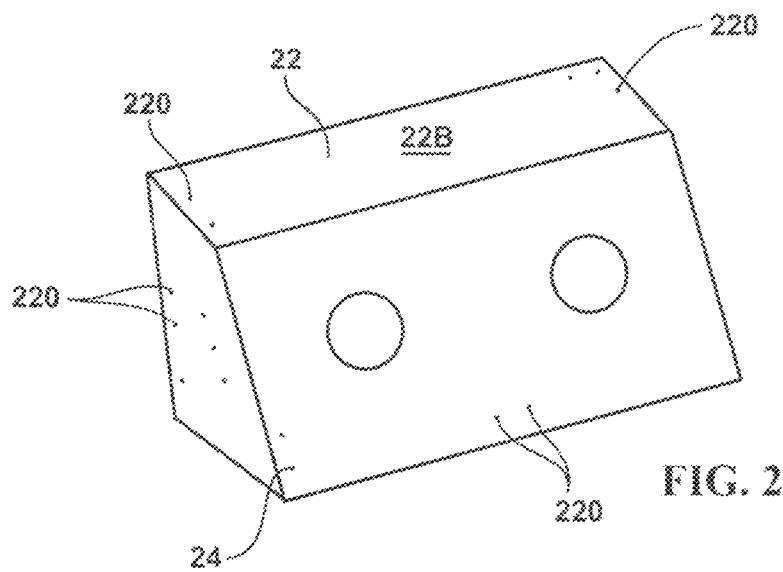
FIG. 2A is a perspective view of a conformable nasopharyngeal tampon according to the present invention in an uncompressed state.
Figure 2B:
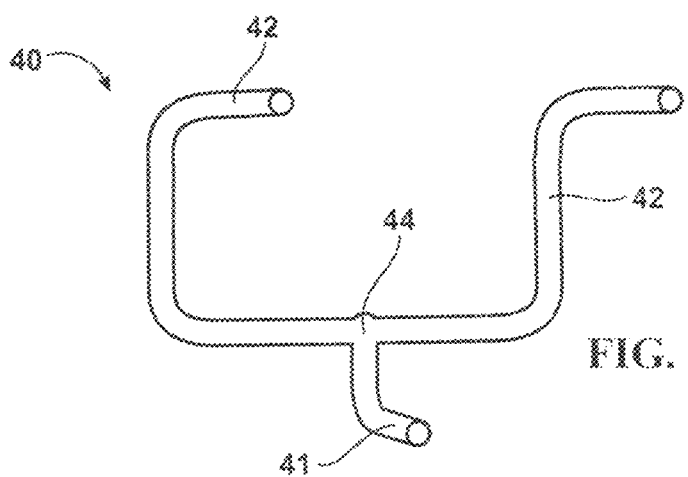
FIG. 2B is a fragmentary perspective view of a suction tube assembly usable with the tampon of FIG. 2A and usable for suction out of the mouth of the patient.
Figure 2C:
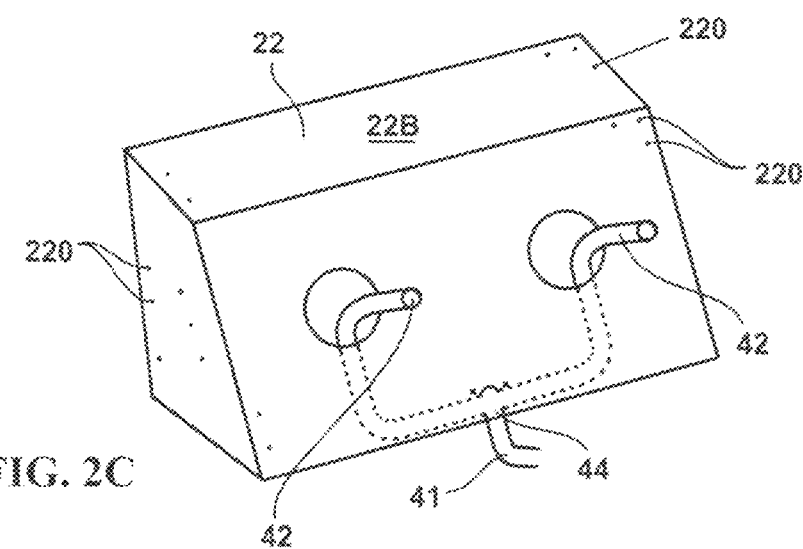
FIG. 2C is a perspective view of the tampon of FIG. 1A having the suction tube assembly of FIG. 2B installed therein and the branches of the suction tube shown in phantom.

The terms "upper", "lower", "top", "bottom", "left", "right", "front", "forward", "rear", and "rearward" define directions or orientations with respect to the tampon 22 as viewed in FIG. 2C. It will be understood that the spatially relative terms "upper", "lower", "top", "bottom", "left", "right", "front", "forward", "rear", and "rearward" are intended to encompass different orientations of the apparatus 20 in use or operation in addition to the orientation depicted in the figures. For example, if the tampon 22 in the figures is turned over, elements described as "upper" elements or features would then be "lower" elements or features. The front of the tampon 22 faces towards the doctor when the tampon 22 inserted into the patient. The terms "joined" and "connected" refer to configurations where two juxtaposed components are in direct contact or have intervening elements therebetween. All numbers and ranges claimed herein are approximate and the lower end of any range may be combined with the upper end of any range for that same parameter.

As used herein, a doctor refers to a physician, such as but not limited to an otolaryngologist, an otorhinolaryngologist, or a veterinarian, and to qualified medical professionals acting under instruction from the physician/veterinarian to perform the steps and/or use the apparatus 20 described and claimed below. The patient may be a human or an animal with a similar physiology, such as a mammal. While the description below is in non-limiting terms relating to nasopharyngeal medical procedures, one of skill will realize the invention is not so limited and only limited by the appended claims.

The invention described herein may be particularly used for middle ear surgery, oropharynx surgery, tonsillar surgery, as well as surgery for other anatomical passageways of the ear, nose and throat. In the application of nasal surgery, the tampon will usually be deployed into the nasopharynx. In the application of tonsillectomy, the tampon will be deployed into the tonsillar fossae. In the application of middle ear surgery, the tampon will be deployed into the middle ear. All such anatomical features of the patient are hereby collectively referred to as anatomical cavities, or individually as an anatomical cavity. As used herein anatomical cavity refers exclusively to cavities which are accessed by a doctor during surgery, particularly during otolaryngological or otorhinolaryngological surgery, to insert and remove a tampon 22 as part of the surgical procedure and specifically exclude body cavities routinely accessed by patients, such as a vaginal cavity.

Referring to FIGS. 1A, 1B, 1C and 1D, in one embodiment the apparatus 20 according to the present invention is usable for deploying and controlling intranasal bleeding and to collect nasal secretions, blood, and/or irrigation fluid from a patient. The apparatus 20 may also be used for drug delivery, including topical medications 230. The apparatus 20 may be single use, or may be restored between patients, with sterilization, cleaning and repackaging, in whole or in part.

The apparatus 20 comprises a hollow, longitudinally extending deployment tube 30 having longitudinally opposed proximal and distal ends 31, 32. The deployment tube 30 may be joined to and in communication with a hollow housing 60 having longitudinally opposed proximal and distal ends 61, 62. The deployment tube 30 and housing 60 may be integral or may be removably joined together. The distal end 62 of the housing 60 may be joined to the proximal end 31 of the deployment tube 30, to allow kinematic communication therebetween. The plunger 23 slides freely and longitudinally between the housing 60 and deployment tube 30, extending outwardly from the proximal end 61 of the housing 60 and, upon deployment of the tampon 22 and/or functional additive(s) 220 as described below extends outwardly from the distal end 32 of the deployment tube 30.

A longitudinally translatable, slidable plunger 23 is disposed inside of the housing 60 and deployment tube 30, extending therebetween. The plunger 23 may be longitudinally protracted and retracted along the longitudinal axis LA in the forward and reverse directions, respectively, responsive to manipulation by the doctor. The plunger 23 may move in a rectilinear motion, a curvilinear motion or combinations thereof. The plunger 23 also has longitudinally opposed proximal and distal ends corresponding to the proximal and distal ends 31, 32 of the deployment tube 30, respectively. The deployment tube 30 may be of constant cross section in the ID or may be of variable cross section. More particularly, the ID of the deployment tube 30 may taper to a smaller cross section as the distal end 32 is approached.

The distal end 32 of the plunger 23 preferably has a flat plate 25, for pushably and removably delivering a tampon 22 into the nasopharynx and/or choanae. The tampon 22 is expelled out of the distal end 32 of the deployment tube 30 in response to forward advancement of the plunger 23. The tampon 22 preferably has one or more trailing strings 34 to assist in positioning and subsequent removal.

Examining the invention in more detail, the deployment tube 30 may have a round cross section with an OD of about 2 mm to 6 mm, preferably about 2.5 mm to 5.6 mm and more preferably about 2.7 mm to 5.3 mm or as may be suitably sized for the intended patient, particularly an adult human patient, and an ID configured to receive and accommodate therein the tampon 22, strings 34, plunger 23 and other features described herein. The deployment tube 30 and positioning strings 34 may have a length ranging from 10 to 30 cm to provide for convenient usage by the doctor. In all embodiments the deployment tube 30 is hollow to receive a tampon 22 and/or functional additive 220 therein. While a round deployment tube 30 is illustrated, one of skill will recognize the invention is not so limited. The deployment tube 30 may be of any suitable cross section, including cross sections having a non-axisymmetric section modulus. The deployment tube 30 may be of constant or variable cross section. The deployment tube 30 is preferably flexible, to minimize patient discomfort and provide for easier insertion.

The invention is shown with the housing 60 having a larger diameter than the deployment tube 30, to provide for containment of the plunger 23, plate 25 and associated hardware therein. But one of skill will recognize that the deployment tube 30 and housing 60 may be of equal or similar diameter. While the housing 60 and deployment tube 30 are described in non-limiting, exemplary terms of a round cross section, one of skill will recognize that other geometries are feasible and within the scope of the invention except as specifically claimed herein.

The deployment tube 30 and housing 60 may be made of silicone and/or plastic polymers including without limitation suitable elements such as Pebax, polyimide, braided polyimide, polyurethane, Nylon, PVC, Hytrel, HDPE, PEEK, stainless steel and fluoropolymers like PTFE, PFA, FEP and EPTFE. The deployment tube 30 may have a variety of surface coatings e.g. hydrophilic lubricious coatings, hydrophobic lubricious coatings, abrasion resisting coatings, puncture resisting coatings, electrically or thermal conductive coatings, radiopaque coatings, echogenic coatings, thrombogenicity reducing coatings and coatings that release medication 230.

The proximal end 31 of the plunger 23 may have a grip 28 to enable manual advance and retraction of the plunger 23 by the doctor. The grip 28 extends outwardly from the proximal end 61 of the housing 60, to enable bilateral longitudinal movement of the plunger 23 relative to the sheath of the deployment tube 30. While a thumbhole is shown for the manual grip 28, one of skill will recognize the invention is not so limited and other configurations are suitable for ergonomics. The plunger 23 may optionally be spring 27 biased for automatic retraction away from distal end 32. The plunger 23 may be made of spring steel or nylon to be flexible for insertion and retraction. The plunger 23 may be lubricated with a physiologically and topically inert lubricant for smooth bilateral operation in the forward and retraction directions, parallel to the longitudinal axis LA.

The distal end 32 of the plunger 23 preferably has a plate 25 for protractivley pushing the tampon 22 in the forward longitudinal direction upon protraction of the plunger 23 by the doctor. The plunger 23 and plate 25 may be integral or made of discrete, connected components. The plate 25 may be flat, as shown, concave towards the tampon 22 or any other suitable shape. Preferably the plate 25 is generally perpendicular to the longitudinal axis LA of the deployment tube 30. The plate 25 preferably has at least one or one or more notches 26 or holes 26 therethrough which serve as opening 26 for the strings 34 to pass from one side of the plate 25 to the other. The plate 25 and grip 28 may be attached to the plunger 23 using adhesive, welding, screw threads, etc.

The at least one hole 26 or notch 26 may correspond in number to the number of optional strings 34 attached to the tampon 22. For example, if the tampon 22 has four strings 34, as shown, the plate 25 may optionally have four holes 26, so that each string 34 has a respective hole 26, minimizing entanglement. The holes 26 or notches 26 may be equally circumferentially spaced about the plate 25, as shown, for improved handling as described below. The holes 26 or notches 26 also provide openings 26 for equalizing pressure across the plate 25, to prevent the plunger 23 from drawing a vacuum in use. As used herein, the term "openings 26" is inclusive of notches 26, holes 26 and combinations thereof through the plate 25.

The tampon 22 may be conformable, compressible/expandable, absorbent and soft to provide for patient comfort. By compressible it is meant that the tampon 22 can be squeezed into a volume which is smaller than the initial uncompressed volume, in order to fit inside the deployment tube 30. By expandable it is meant that the tampon 22 quickly returns to its original volume, or nearly so, in the absence of confining pressure. The tampon 22 of the present invention is not inflatable, and not configured to be subjected to fluid pressure for inflation or deflation.

One of skill will understand that inside the nasopharyngeal region of a patient the tampon 22 will not achieve its original or unconstrained volume upon expulsion through the distal end 32 of the deployment tube 30, due to constraint by the cavity volume of the patient's anatomy. The uninflatable surgical tampon 22, particularly a nasopharyngeal nasal packing tampon 22 may have unconstrained dimensions of about 1.5 to 2.5 cm anterior/posterior, a height of about 1 to 4 cm and lateral width of about 2 to 8 cm in order to be sized for an adult human and to translatably and slidably fit into the deployment tube 30 upon compression. A tampon 22 for a child may be about the same size or smaller. An uninflatable unexpanded sinus packing tampon 22 may have dimensions of about 2.5×3.5 cm, about 1.2×2.0 cm or about 0.6×1.2 cm. Of course the tampon 22 may be made smaller, larger or differently shaped to accommodate a specific mammalian patient.

The tampon 22 may comprise a chassis 400 of open cell sponge material. Alternatively or additionally, the tampon 22 may comprise a bioresorbable woven fleece that may be used dry or hydrated after functional endoscopic sinus surgery (FESS). A suitable nasal packing is sold by Medtronic Inc. of Minneapolis, MN under the name Mero-Gel®. Alternatively or additionally the tampon 22 may comprise cellulosic material, such as tissue grade paper.

The tampon 22 may have a monolithic construction of the chassis 400 comprising the sponge material, fleece and/or cellulose, or may be polylithic formed of separable or inseparable parts. The chassis 400 of the tampon 22 may be homogenous or heterogenous. If a heterogenous chassis 400 is selected, the tampon 22 may have variable density. The variable density may provide a relatively lower density zone 225 where blood and other fluids are expected to insult the tampon 22 for gush acquisition. A high density zone 226 of the chassis 400 may be used, particularly near the front of the tampon 22, for storage of absorbed fluids. Absorbed fluids may transport from the relatively lower density acquisition zone 225 to the relatively higher density storage zone 226 by capillary attraction.

Alternatively or additionally the tampon 22 may have a heterogenous material construction. For example, relatively hydrophilic fibers, such as cotton wool and linen may be used for the storage zone 226. Less hydrophilic fibers may be used for the acquisition zone 225, so that fluids are transported from the acquisition zone to the storage zone. Two different zones 225, 226 which are defined by density and hydrophilicity have zones 225, 226 defined by intensive properties and can be used with tampons 22 of various sizes and geometries. Relative hydrophilicity may be determined in known fashion by measuring the contact angle of deionized water on the chassis 400 material.

Optionally, one face of the tampon 22 may be covered by a liquid impermeable barrier 22B to prevent draining of fluids into the esophagus. A polyolefinic film, such as LDPE film, may be used as a suitable impermeable barrier 22B. The impermeable barrier 22B is preferably positioned on the downstream surface of the conformable nasopharyngeal tampon 22 when the conformable nasopharyngeal tampon 22 is disposed in the choanae and/or nasopharynx of the patient, in order to provide open surfaces for absorption.

Referring to FIGS. 2A, 2B and 2C, the conformable nasopharyngeal tampon 22 may be generally parallelepiped shaped, for convenient insertion into and removal from the patient. The tampon 22 may have a pair of passages for receiving two respective branches 42 of a suction tube 40 assembly. The passages may extend through the upper and lower end of the tampon 22 or through any other faces of the tampon 22. The suction tube 40 branches 42 have openings in fluid communication with the nostrils of the patient and merge into a main feeder 41 of the suction tube 40 at a confluence 44 and are aligned with the nostrils of the patient at their upper ends. When the tampon 22 is disposed in the nasopharyngeal area of the patient, the main feeder 41 of the suction tube 40 may be routed out through the mouth. The main feeder 41 of the suction tube 40 portion branches 42 extend through respective passages so that the upstream ends of the passages are in fluid communication with the nasal passageway. The main feeder 41 of the suction tube 40 portion extends out of the mouth and is preferably fluidly connected to a suction source 45. The suction tube 40 assembly may be attached to the tampon 22 in any suitable manner such as by adhesive or a friction fit. The suction tube 40 is operative to remove fluid and debris collected by the conformable nasopharyngeal tampon 22 from the patient.

A first string 34 may be secured to the conformable nasopharyngeal tampon 22 proximate the top thereof. The first string 34 is routed through the nose and is used to pull the tampon 22 into the choanae and nasopharynx of the patient. A second string 34 may be secured proximate the bottom of the tampon 22 and is suitable for pulling the tampon 22 from the choanae and/or nasopharynx of the patient through the mouth of the patient to remove the conformable tampon 22 from the patient. The tampon 22 may include one positioning string 34, plural positioning strings 34, a suction tube 40 or any combination thereof. The tampon 22 may be polygonal, such as a-non-limiting parallelepiped, having defined faces. The positioning strings 34 may be attached to mutually opposed faces of the tampon 22, adjacent faces of the tampon 22 or the same face of the tampon 22. Positioning of the tampon 22 can occur by disposing the tampon 22 in the anatomical cavity of the patient, somewhat behind the ultimate desired position. Then the doctor can guide the tampon 22 into the desired position by pulling or tugging on the appropriate positioning string 34.

The tampon 22, and any associated strings 34, suction tubes 40, functional additive(s) 220, etc. (herein referred to as a refill) may be single use, and may be discarded after first usage. The housing 60, deployment tube 30, plunger 23, plate 25, optional grip 28, optional return spring 27 (herein collectively referred to as hardware) and other such components may be restored and reused with a refill tampon 22. This arrangement provides flexibility for the doctor to select a first tampon 22 for a particular patient and a second, and different, tampon 22 for the same or different patient, without requiring plural hardware. For example, the first part of a medical procedure may call for a first tampon 22, which is inserted into and later removed from the patient. During the same procedure, a second, and different, tampon 22 may be called for. The doctor may insert the second tampon 22 using the same hardware as was used for the first tampon 22. The second tampon 22 provides for flexibility in selecting a differently sized tampon 22 for different parts of the procedure.

If desired the refill and hardware may be provided in a kit 450, as described below. The kit 450 may contain a singular hardware item with plural refills. This kit 450 offers the benefit that for a particular procedure, multiple hardware, and associated sterilization/disposal are unnecessary, while the doctor can deploy as many tampons 22 and different types of tampons 22 as may be necessary.

Figure 3A:
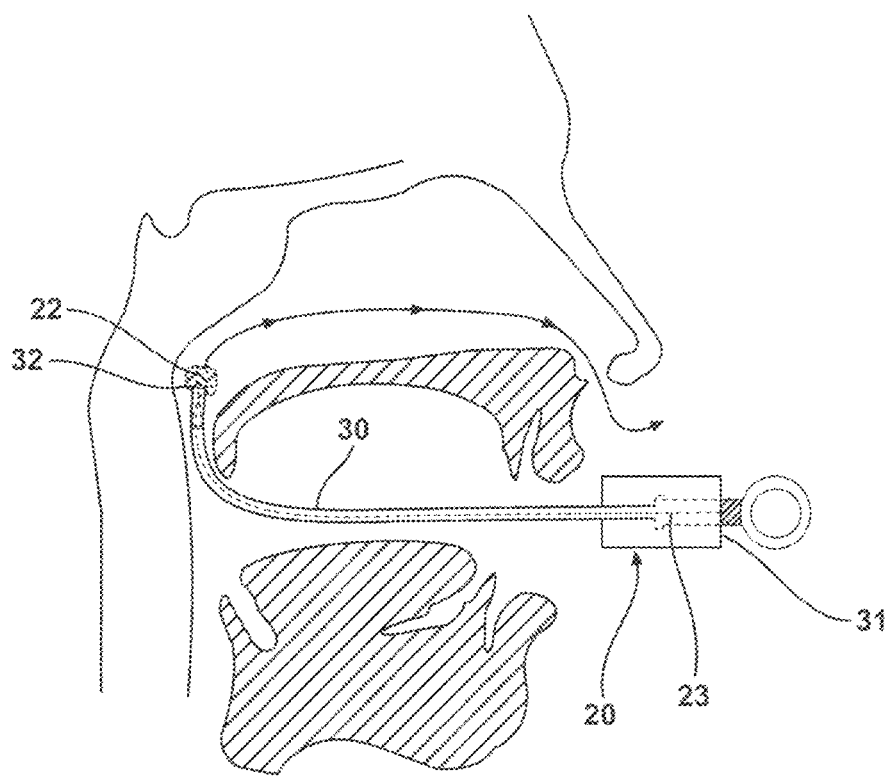
FIG. 3A is a profile sectional view of a human head showing the apparatus of the present invention while disposing a tampon into the nasopharyngeal region of a patient, partially offset to show the apparatus in profile without a sectional cut.
Figure 3B:
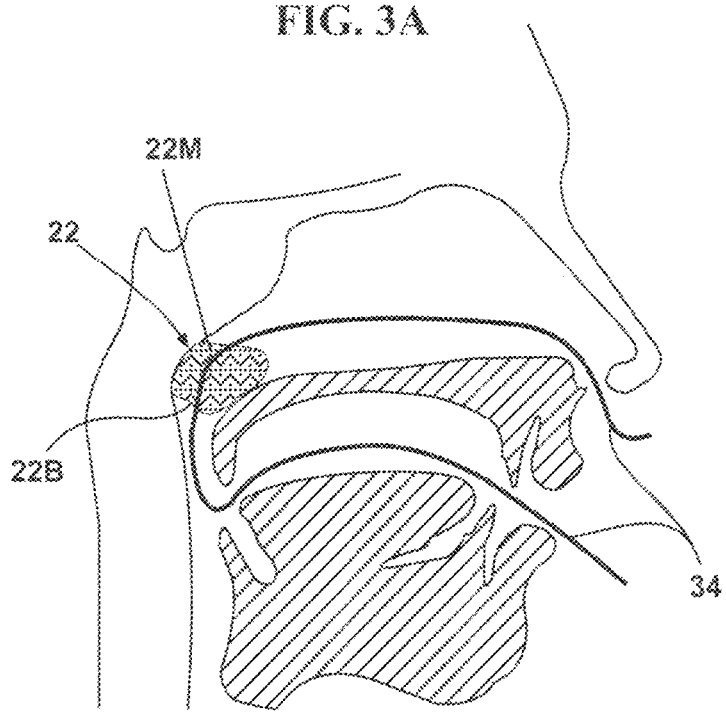
FIG. 3B is a profile sectional view of the human head of FIG. 3A, showing the expanded tampon of the present invention disposed in the nasopharyngeal region of a patient, and having a positioning string through the nose and a positioning string through the mouth.

Referring to FIGS. 3A and 3B, in use, a tampon 22 may be compressed and inserted through the distal end 32 of the deployment tube 30, where the tampon 22 is securely retained for use. The deployment tube 30 is inserted through the mouth/nose of the patient and the distal end 32 guided to the desired location. The doctor depresses the plunger 23 to expel the compressed tampon 22 at the desired location. Upon expulsion, the tampon 22 expands to conform to and fill the cavity where expelled. Then one or more positioning strings 34 are extracted through the nose and/or mouth, optionally using hemostats as helpful.

Figure 3C:
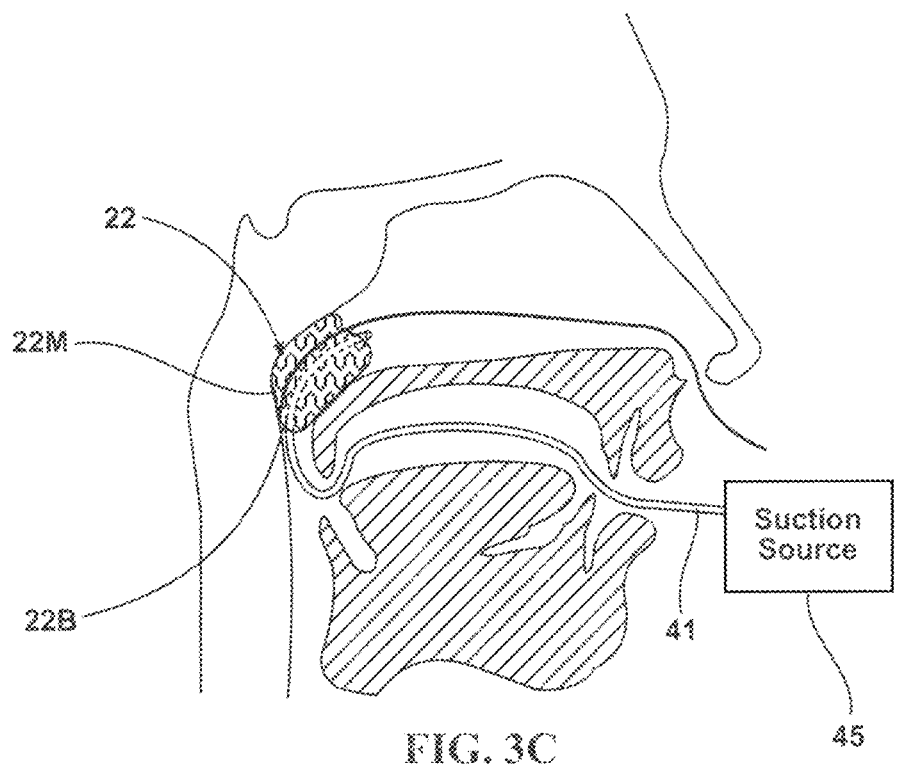
FIG. 3C is a profile sectional view of the human head of FIG. 3A, showing the expanded tampon of the present invention disposed in the nasopharyngeal region of a patient, and having a suction tube through the mouth.
Figure 3D:
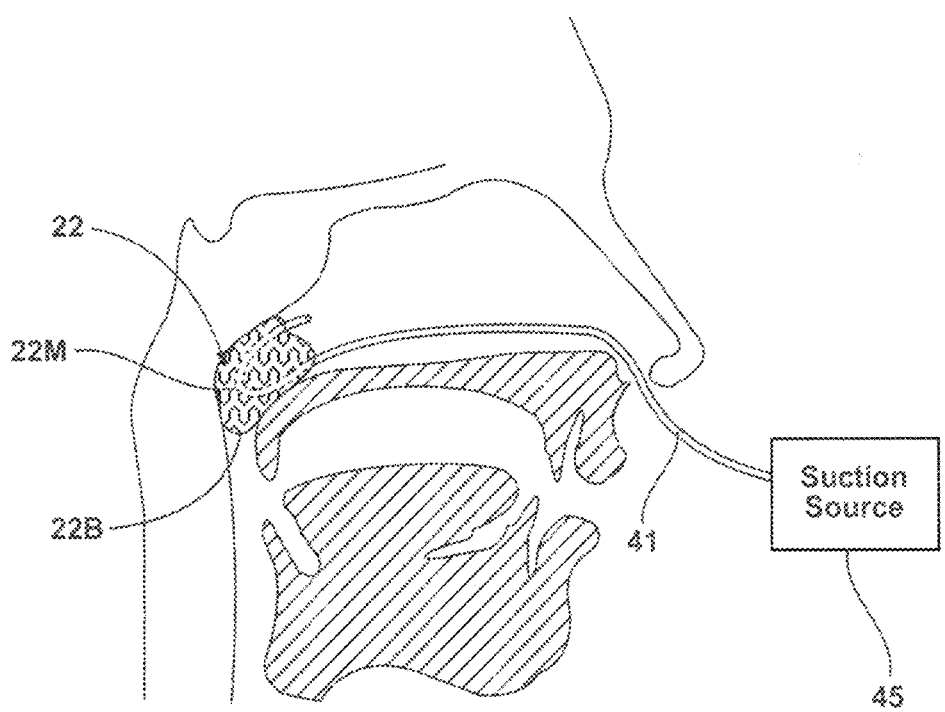
FIG. 3D is a profile sectional view of the human head of FIG. 3A, showing the expanded tampon of the present invention disposed in the nasopharyngeal region of a patient, and having a suction tube through the nose.

Referring to FIGS. 3C and 3D, if desired, the tampon 22 may have one or more suction tubes 40 instead of or in addition to the positioning strings 34. Upon placement of the tampon 22, the suction tube(s) 40 may be extracted through the through mouth or nose as shown in FIGS. 3C and 3D, respectively or both. The suction tubes 40 may then remain dormant or be connected to a medical suction source 45 as desired. The medical suction source 45 is conventional and forms no part of the claimed invention.

The conformable nasopharyngeal tampon 22 may include passages for receiving suction tube 40 branches 42 of a suction tube 40 assembly that enter and exit the upper end of the apparatus 20. The suction tube 40 branches 42 merge into a main feeder 41 of the suction tube 40 single portion at their lower ends and are aligned with the nostrils of the patient at their upper ends. In this embodiment the suction tube 40 assembly is routed through the nose of the patient and then then through the passages so that the upstream end of the passage is in fluid communication with the nasal passageway. The single main feeder 41 of the suction tube 40 portion extends from the conformable nasopharyngeal tampon 22 and then through one of the nostrils of the nose of the user. The suction tube 40 assembly may also be attached to the tampon 22 in any suitable manner such as a friction fit or adhesive. The suction tube 40 is operative to suction fluid and debris collected by the conformable nasopharyngeal tampon 22.

In use, the deployment tube 30 is inserted into either the nose or mouth of a patient with the distal end 32 of the deployment tube 30 entering first into the nose or mouth of the patient. The plunger 23 is longitudinally advanced through the deployment tube 30 until the plunger 23 engages and moves the conformable nasopharyngeal tampon 22 out through the distal end 32 of the deployment tube 30 and into the patient. The conformable nasopharyngeal tampon 22 may be positioned in the choanae and nasopharynx of the patient by optionally using the positioning strings 34 such that the conformable nasopharyngeal tampon 22 expands to limit posterior nasal fluid from flowing into the esophagus. After the relevant portion of the medical procedure is completed, the conformable tampon 22 may be returned to and through the leading end of the deployment tube 30 and stuffed into the deployment tube 30 by withdrawing the positioning strings 34. The deployment tube 30 is extracted from the patient and the medical procedure continues as necessary. The tampon 22 hardware and refill may then be discarded or the hardware and refill may be sterilized and restored for reuse. Alternatively one of the hardware and refill, preferably the hardware, may be sterilized and restored and the other, preferably the refill, discarded.

Figure 4A:
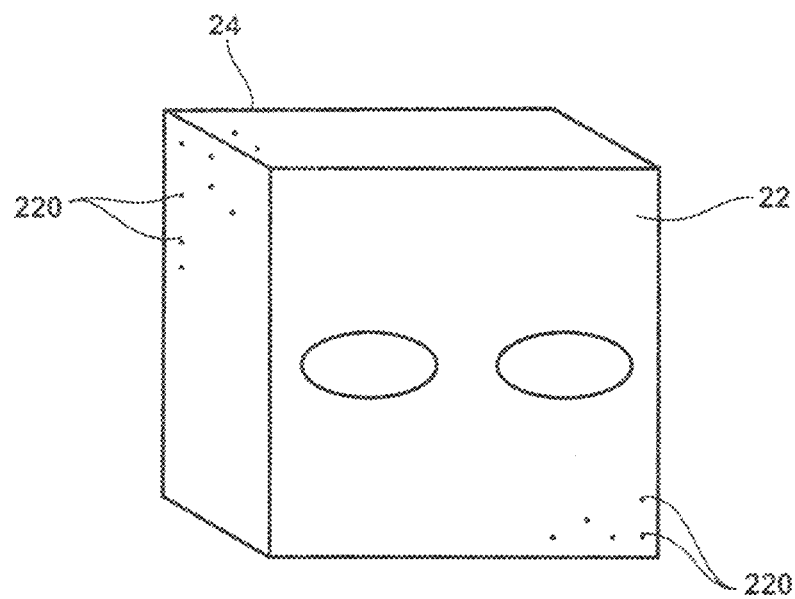
FIG. 4A is a perspective view of an alternative embodiment of a conformable nasopharyngeal tampon according to the present invention in an uncompressed state.
Figure 4B:
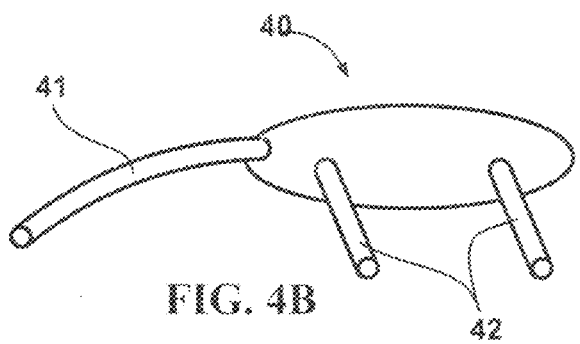
FIG. 4B is a fragmentary perspective view of a suction tube assembly usable with the tampon of FIG. 4A and usable for suction out of the mouth of the patient.
Figure 4C:
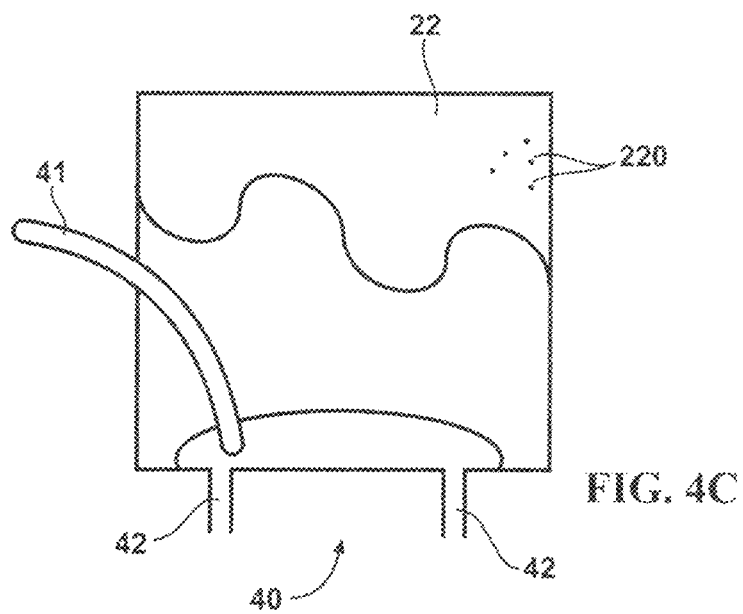
FIG. 4C is a top plan view of the tampon of FIG. 4A shown partially in cutaway and having the suction tube assembly of FIG. 4B installed therein.

Referring to FIGS. 4A, 4B, and 4C, it will be apparent to one of skill that variant embodiments are feasible. For example, the tampon 22 may have a suction tube 40 assembly which has the main feeder 41 of the suction tube 40 exit the patient through the nose, rather than through the mouth, as described above. Two suction tube 40 branches 42 have openings in fluid communication with the nostrils of the patient and merge into a main feeder 41 of the suction tube 40 portion at a confluence 44. When the tampon 22 is disposed in the nasopharyngeal area of the patient, the main feeder 41 of the suction tube 40 may be routed out through either nostril. The main feeder 41 of the suction tube 40 may be proximate either side of the tampon 22, for alignment with a respective nostril. The main feeder 41 of the suction tube 40 is preferably fluidly connected to a medical suction source 45 in known fashion. As described above, the suction tube 40 is operative to remove fluid and debris collected by the conformable tampon 22 from the patient.

Figure 5B:
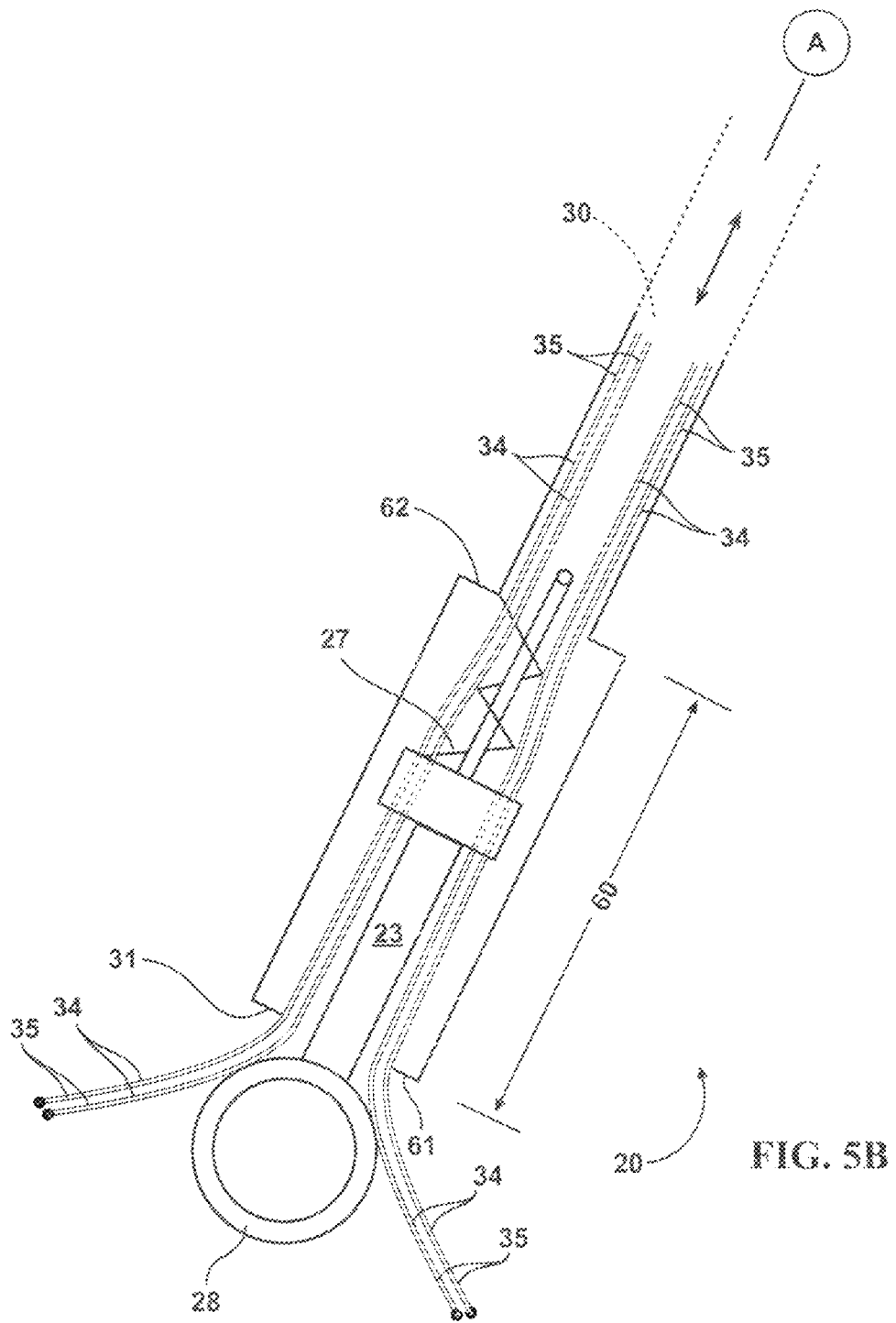

Referring to FIG. 5A and FIG. 5B, in another embodiment, the tampon 22 may have plural and independent spaced apart strings 34. When the tampon 22 is disposed in the deployment tube 30, the plurality of spaced apart positioning strings 34 extend to and out the proximal end 31 of the deployment tube 30. By spaced apart, it is meant that the attachment positions of the strings 34 to the tampon 22 are sufficiently spaced away from other strings 34 so that the doctor can manipulate and reposition the tampon 22 by using the strings 34 while in the patient. By independent it is meant that each string 34 can be manipulated by the doctor while the tampon 22 is disposed in the anatomical cavity without involving manipulating other strings 34.

While four positioning strings 34 are shown, one of skill will understand any plurality comprising at least two positioning strings 34, but not more than a reasonable number of positioning strings 34 may be utilized. For a generally rectangularly shaped tampon 22, as shown, one positioning string 34 may be attached to each quadrant and preferably attached proximate to each corner. Generally it is preferred the tampon 22 have at least three spaced apart positioning strings 34, while more than six positioning strings 34 is likely unnecessary.

By pulling on or tugging the appropriate string 34, the doctor can primarily move only the respective corner, or quadrant, of the tampon 22. If desired, the independent, spaced apart strings 34 may be color coded or provided with other visual indicia 35, such as spiral tracers or being of different diameters, to assist the doctor in knowing which string 34 controls a specific corner, quadrant or portion of the tampon 22. This embodiment provides the benefit that the doctor can quickly identify which string 34 is desired for manipulation of the tampon 22. Additionally or alternatively the strings 34 may have tactile indicia 35. Tactile indicia 35 include different cross sectional shapes different sizes, different textures, etc. of the strings 34 which suitable for tactile perception by the doctor. This embodiment provides the benefit that the doctor does not have to look at the strings 34 during the procedure and risk potential distraction.

In another execution, the spaced apart strings 34 may be monochromatic, but having indicia 35 of increasing darkening or lightening shades. The strings 34 may have indicia 35 starting with, for example, a string 34 in the 12 o'clock position having a first shade, a string in the 3 o'clock position having the next darker (or lighter) shade, a string 34 in the 6 o'clock position having the next darker (or lighter) shade, etc., until all strings 34 in the plurality have been accounted for in a manner that the doctor can associated each string 34 with a unique position of the tampon 22. The indicium 35 of each string 34 provides the doctor with the understanding of which string 34 to manipulate in order to properly position the tampon 22 in the anatomical cavity.

The plate 25 can have holes 26 or notches 26 to allow passage of the positioning strings 34 therethrough. Preferably peripheral notches 26 are used, to increase radial separation of the strings 34. Increased radial separation is prophetically believed to reduce tangling of the strings 34. When the tampon 22 is disposed in the choanae and/or nasopharynx of the patient, the doctor may use one or more of the positioning strings 34 spanning the plate 25 to fine tune the position of the tampon 22. Each patient has a unique size and shape of nasopharyngeal cavity, and repositioning of tampon 22 may be necessary to provide optimal fit for that patient. For example, if the doctor wishes to retract only the lower edge of the tampon 22, slight tension on either or both of the lower positioning strings 34 will slightly move the lower edge outward, towards the doctor.

Figure 6:
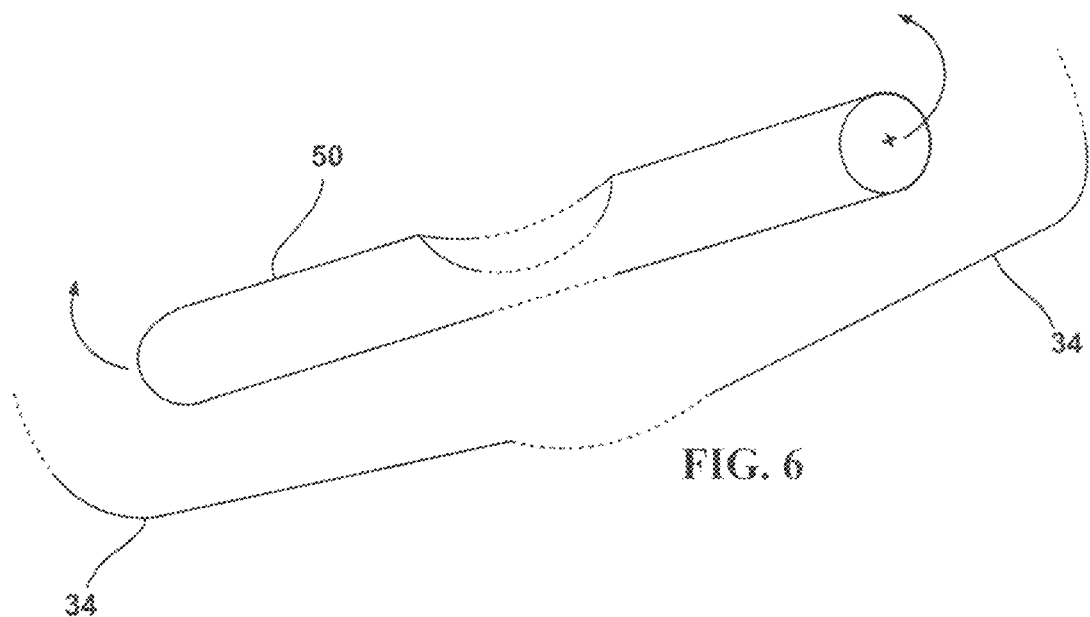
FIG. 6 is a perspective view of an indeterminant length nasal bridle usable with the present invention.

Referring to FIG. 6, a nasal bridle 50 may optionally be used to cushion the columella. The nasal bridle 50 may be made of silicone or other soft material which conforms to the underside of the columella, bending in the direction of the arrows. The tampon 22 may have a string 34 extending from each nostril and which ties under the columella to hold the bridle 50 in place, secure the tampon 22 in position and prevent damage to this sensitive and delicate tissue. The nasal bridle 50 may have medication 230, luminescent material 260 and/or other functional additives 220 as described below disposed therein.

In some instances, patients are unable to tolerate placement of the nasaopharyngeal tampon 22 through mouth with a common surgical instrument, in which case the nasopharynx is accessed through a reverse oro-nasal pull-through technique as described in Boston AG. A Novel Endoscopic Technique for Failed Nasogastric Tube Placement. Otolaryngol Head Neck Surg. 2015 October; 153(4):685-7. doi: 10.1177/0194599815588914. Epub 2015 Jun. 9. PMID: 26059534, the disclosure of which is incorporated herein by reference. In this procedure, a flexible endoscope is passed through the nasal cavity, grasped in the oropharynx and pulled out the mouth. The ipsilateral securing string 34 is non-trivially attached to distal of the scope to the endoscope and pulled back into the oral cavity, superiorly through the pharynx and out the nasal cavity. A second pass is then made through the other nostril to draw out the contralateral securing string 34. The strings 34 are then secured over the flexible nasal bridle 50.

Figure 7:
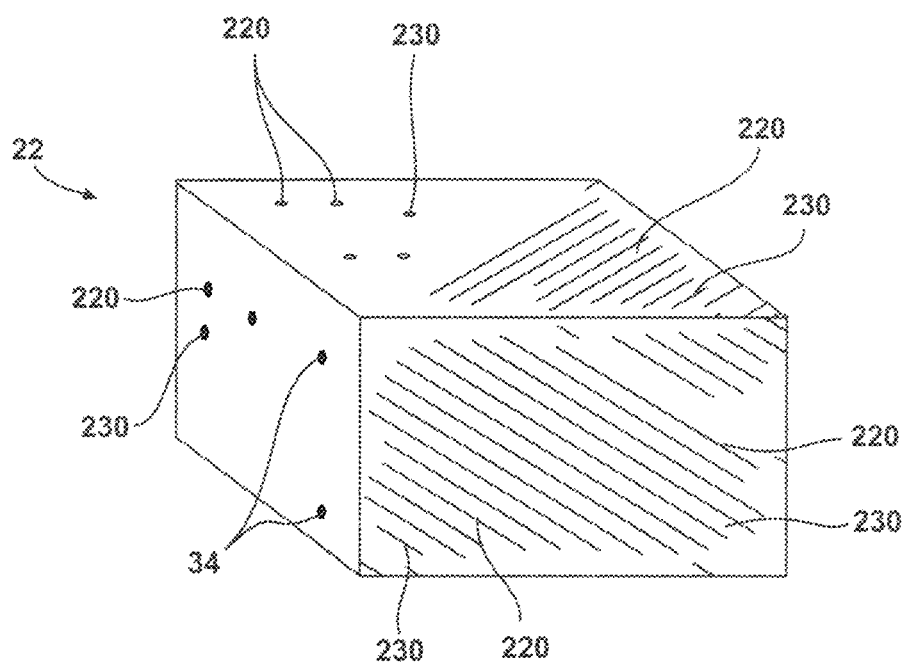
FIG. 7 is a perspective view of a tampon having a medication as a functional additive.

Referring to FIG. 7, in another embodiment, the tampon 22 may be impregnated, infused and/or saturated with at least one or with more than one functional additive 220. The functional additives 220 described herein may be homogenously or heterogeneously distributed throughout the tampon 22. The functional additive(s) 220 may be discretely or continuously disposed throughout all or a portion of the tampon 22. The functional additives 220 described herein may be used with any embodiment of tampon 22 having the strings 34 and optional indicia 35 therefor, the kit 450 and/or the apparatus 20 described herein.

In one execution, the functional additive 220 may be any diagnostic or therapeutic medication 230, as used herein to be broadly construed to include any feasible drugs, prodrugs, proteins, gene therapy preparations, cells, diagnostic agents, contrast or imaging agents, biologicals, etc. Such substances may be in bound or free form, liquid or solid, colloid or other suspension or solution. For example, in some applications where it is desired to treat or prevent a microbial infection, the functional additive 220 to be delivered may comprise pharmaceutically acceptable salt or dosage form of an antimicrobial agent (e.g., antibiotic, antiviral, antiparasitic, antifungal, etc.), a corticosteroid or other anti-inflammatory (e.g., an NSAID), steroids (e.g. triamcinolone), anti-fibrotic agents (TNF-alpha inhibitors) dupixent (anti-polyp agent) antibiotics (e.g. doxycycline, bactroban), a decongestant (e.g., vasoconstrictor), a mucous thinning agent (e.g., an expectorant or mucolytic), an agent that prevents or modifies an allergic response (e.g., an antihistamine, cytokine inhibitor, leucotriene inhibitor, IgE inhibitor, immunomodulator), vasoconstricting agent (e.g., 0.025-0.5% phenylephyrine or Oxymetazoline hydrochloride (Neosynephrine or Afrin) to cause shrinkage of the nasal tissues, Ringers solution, hyaluronic acid, hydrogel nasal dressing, an antibacterial agent such as provodine iodine, combinations thereof, all collectively referred to herein as 'medication' 230.

By way of non-limiting example, the medication 230 may comprise anesthetic agents for comfort and gag suppression, antibiotics, hydrocortisone, saline rinse, hemostatic agents, steroids, etc. The tampon 22 may be impregnated with medication 230 throughout or predominantly on the outer surfaces. The medication 230 may be transferred to the nasopharynx, choanae or other topical contact points due to the intimate contact during and throughout the medical procedure. The tampon 22 may be repositioned, as desired, to deliver medication 230 to various regions within the nasopharynx and/or choanae of the patient. The medication 230 provides the functional benefits of healing, comfort and patient care, without requiring a separate administration of drugs during the medical procedure.

Figure 8:
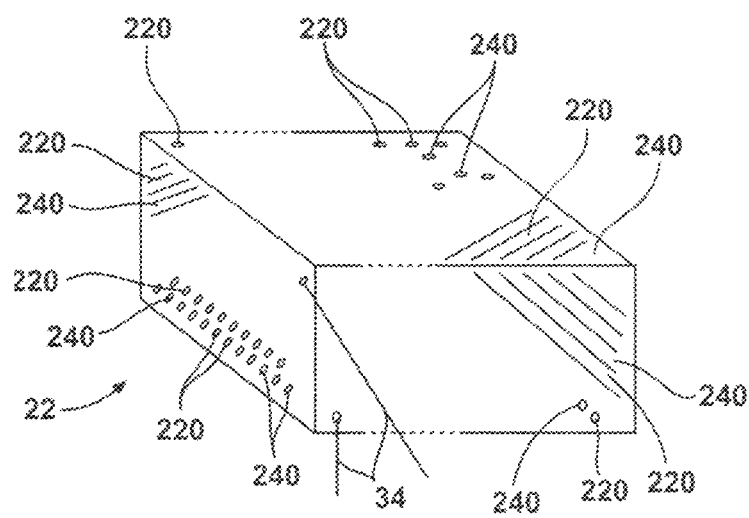
FIG. 8 is a perspective view of an indeterminate width tampon having absorbent gelling material/superabsorbent polymer as a functional additive.

Referring to FIG. 8, in another execution the tampon 22 may contain a functional additive 220 which is a medical grade absorbent gelling material [AGM] 240, commonly referred to as superabsorbent polymers [SAP] 240. The AGM 240 provides the functional benefit of hemostasis. The AGM 240 is commonly made from the polymerization of acrylic acid blended with sodium hydroxide in the presence of an initiator to form a poly-acrylic acid, sodium salt, often referred to as cross-linked sodium polyacrylate. The AGM 240 advantageously absorbs any aqueous bodily fluid and can absorb 200X its own weight in fluids. This arrangement provides the benefit that a small tampon 22 may be used to control large amounts of bleeding or other fluid drainage without becoming oversaturated and potentially harming the patient.

Figure 9:
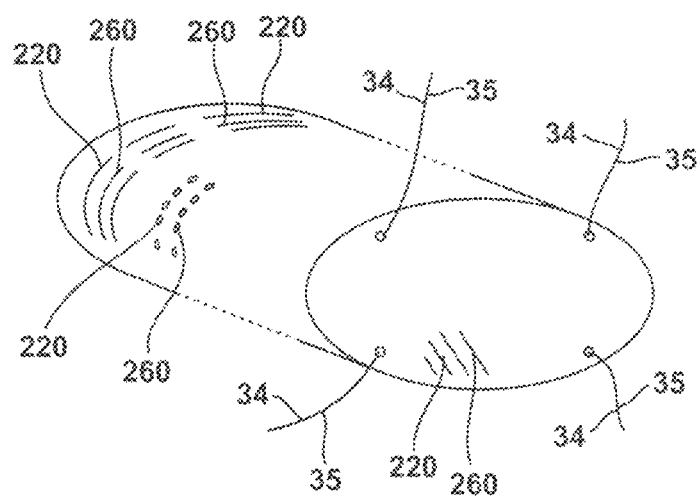
FIG. 9 is a perspective view of an indeterminate depth tampon having absorbent luminescent material as a functional additive.

Beneficially, upon absorption of bodily fluids, the gelatinous nature of the AGM 240 allows it to readily and comfortably conform to the contours of the nasopharynx and/or choanae of the patient. The AGM 240 can be suctioned at the conclusion of the procedure to reduce the volume that the tampon 22 to be removed from the mouth or nasal passage improving patient comfort. Prophetically a cross-linked acrylic acid/sodium acrylate copolymer available from Nippon Shokubai Co., Ltd. of Osaka, Japan under the name AQUALIC™ CA is a suitable AGM 240. Using the AGM 240 as the functional additive 220 provides the functional benefit of hemostasis Referring to FIG. 9, in another embodiment the functional additive 220 of the tampon 22 may comprise luminescent material 260. The luminescent material 260 provides the functional benefit of illuminating the nasopharyngeal region of the patient under consideration during the medical procedure. The illumination allows the doctor to better see the effect of the surgical instruments on the patient, without requiring an additional step or medical instrument, beyond the tampon 22 which would be used in any case.

The luminescent material 260 may comprise any one of or any combination of bioluminescence, chemiluminescence, phosphorescence, and fluorescence for functionality. The luminescence is preferable autogenous although exogenous battery powered LEDs are contemplated for the luminescent material 260. The LED may also be powered by a wireless or preferably wired pulse oximeter. Materials which are luminous include polysaccharides, polyamides and alginate. Chemiluminescence (CL) is the luminescence produced by chemical reactions that induce the transition of an electron from its ground state to an excited electronic state. When the excited molecule decays to the electronic ground state, CL emission at different wavelengths occurs, from ultraviolet-visible to infrared radiation. Chemiluminescence can use the reaction of NO with ozone. The chemical oxidation of NO by ozone yields nitrogen dioxide in an excited state. Relaxation from this excited state produces distinctive light emission (chemiluminescence) that is directly proportional to NO concentration. In a common chemiluminescence device, a pyrolyzer may be used to release the nitrosyl radical. The chemiluminescence may be produced by reactants such as luminol and hydrogen peroxide in the presence of iron, copper or an auxiliary oxidant such as 3-aminophthalate acid. Or the chemiluminescence may be produced by hydrogen peroxide solution and a solution containing a phenyl oxalate ester or containing tert-butyl alcohol. Or luminescent gold nanoclusters (AuNCs) are prophetically suitable for the luminescent material 260. Preferably the luminescent material 260 material does not contain polynuclear aromatic hydrocarbons, Dibutyl phthalate or Diphenyl oxalate in order to minimize tissue irritation.

Bioluminescent materials using a protein based luciferase enzyme may be suitable for the luminescent material 260. Fluorophores may be used for the luminescent material 260 and can be tailored for wavelengths from 480 nm to 725 nm. Prophetically luminescent material 260 as disclosed in US 20210087464 assigned to Nyoka Design Labs of Canada may be suitable.

Optional dyes may be included to color the light to a wavelength suitable for the doctor. Beneficially, typical luminescent materials 260 are non-toxic and unaffected by aqueous fluids such as blood or nasal secretions. Using the luminescent material 260, the doctor can be more aware of the patient response to the surgery, and can thereby inhibit vasovagal response and bradycardia. The luminescent material 260 functional additive 220 provides the benefit of enhanced patient safety without requiring additional material or surgical instruments beyond the tampon 22 which would be used anyway.

Figure 10:
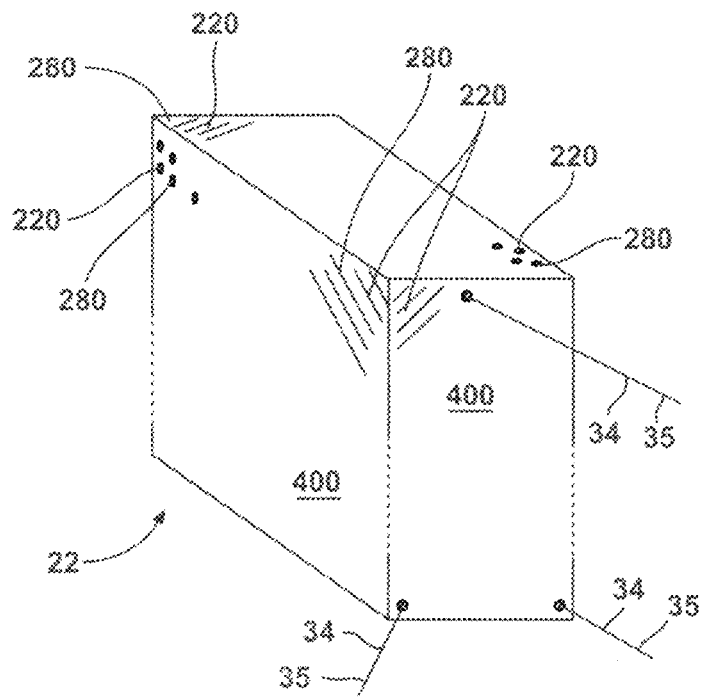
FIG. 10 is a perspective view of an indeterminate height tampon having temperature change material as a functional additive.

Referring to FIG. 10, in another embodiment the functional additive 220 of the tampon 22 may comprise a thermally active or temperature change material 280. This nonlimiting embodiment is shown as having the functional additive 220 in one portion of the tampon 22 and another portion of the tampon 22 being free of the functional additive 220. One face of the tampon 22 has three positioning strings 34 attached thereto. The positioning strings 34 may be disposed in an isosceles triangle, equilateral triangle or other triangular shape for the most advantageous positioning of the tampon 22. The tampon 22 may also have a generally triangular cross section.

The temperature change material 280 may be exothermic for vasodilation or endothermic for vasoconstriction, to thereby inhibit vasovagal response and bradycardia. A suitable endothermic reaction may dissolve ammonium nitrate in water to produce the cooling effect. A suitable exothermic reaction may dissolve calcium chloride, may react iron with air to form iron (III) oxide, or may crystalize sodium acetate. Other prophetically endothermic materials 280 may include a mixture of water, dye, propylene glycol, vinyl-coated silica gel and hydroxyethyl cellulose which can be varied to yield the desired gel viscosity. The functional benefit of the temperature change material 280 is influence of the vasodilation/vasoconstriction to reduce adverse effects on the patient's blood pressure for homeostasis. In the application to tonsillectomy, altering the temperature of the surgical bed could prophetically reduce pain (i.e. warm or cold compresses) and reduce the risk of bleeding.

Figure 11:
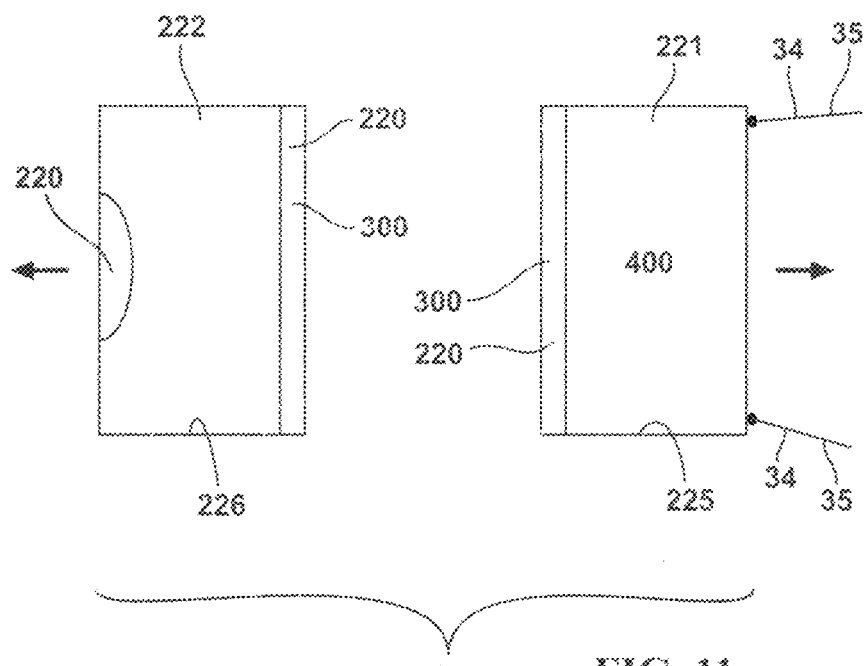
FIG. 11 is a side elevational view of a tampon having two separable bisections, the bisections being shown as separated in the direction of the arrows.

Referring to FIG. 11, in another embodiment the functional additive 220 of the tampon 22 may comprise water soluble adhesive 300, blood soluble adhesive 300 or any soluble adhesive 300 suitable to be the functional additive 220 as described herein.. The adhesive 300 may be disposed in one or more layers spanning the cross section of the chassis 400. This arrangement provides the benefit that the tampon 22 may be divisible in situ in the direction of the arrows. In such an execution the tampon 22 may have two bisections 221 and 222 joined by the water soluble adhesive 300. The bisections 221, 222 maybe equally sized or unequally sized. Preferably, but not necessarily, the bisections 221, 222 are disposed in a front/back isomeric split as the tampon 22 is installed in the patient. Prophetically, suitable adhesives 300 are surgical adhesives 300 which include cyanoacrylates, albumin and glutaraldehyde, poly (ethylene glycol) (PEG), polyurethane, and fibrin. Alternatively and prophetically, an adhesive 300 such as the Swift®tak or HydraFAST-EN® family of adhesives 300 available from H.B. Fuller Co. of St. Paul, MN is suitable.

Either bisection 221, 222, particularly the front bisection 221, may have one or more strings 34 joined thereto. The one or more strings 34 are extended out of the patient's mouth or nose. The tampon 22 typically saturates from front to back. Upon dissolution or solubilization of the adhesive 300, the doctor can use the string(s) 34 to extract the front bisection 221 from the patient, leaving only the rear bisection 222 in the patient to continue the surgical procedure. The rear bisection 222 may deliver medication(s) 230 and post-operatively absorb residual secretions. This arrangement provides the benefit that as the tampon 22 saturates from front to back, the adhesive 300 solubilizes allowing the two separable bisections 221, 222 to disengage. The doctor may then remove front bisection 221 using the string(s) 34. This arrangement allows the doctor to increase patient comfort by having a smaller tampon 22 for the remainder of the procedure. The functional benefit of the adhesive 300 is to reduce the size of a foreign object, such as the tampon 22, temporarily implanted during surgery.

In another embodiment, the tampon 22 may be separable into two bisections 221, 222 without using soluble adhesive 300. The tampon 22 may have bisections 221, 222 autogenously joined at a line of weakness. When the doctor wishes to remove the front bisection 221, the friction of the compressible chassis 400 of the tampon 22 against the walls of the anatomical cavity may hold the rear bisection 222 in place or the rear bisection 222 may be held in place using known surgical instrument or by using the apparatus 20 described herein. Prophetically suitable lines of weakness include perforation and thinned wall sections. While the separable tampon 22 is described above as being divisible into two bisections 221, 222 the invention is not so limited. The tampon 22 may be divisible into three trisections, four or more sections, etc. of equal or unequal size.

Referring still to FIG. 11, the functional additive 220 may comprise a pulse oximeter 320. The pulse oximeter 320 may have capability to measure any of oxygen saturation, breathing rate, perfusion index and particularly pulse rate, and/or any combination thereof. Disposing the pulse oximeter 320 into the tampon 22 juxtaposes the pulse oximeter 320 with the center of the patient's head when the tampon 22 is inserted into the nasopharynx. Such juxtaposition allows the pulse reading to be taken closer to the center of the patient's head, near the internal carotid arteries in the nasopharynx. A pulse oximeter 320 disposed closer to the patient's head is more responsive and more accurate than a like instrument disposed on the fingertip or an instrumentation reading taken from the chest.

The pulse oximeter 320 may be disposed internal to the tampon 22 or at the rear surface of the tampon 22 to directly contact the patient, for perfusion. The pulse oximeter 320 may take readings in known fashion. The pulse oximeter 320 may be generally flat, having a layered construction to contact the wall of the anatomical cavity without undue discomfort to the patient. Prophetically a pulse oximeter 320 may be made according to the teachings of U.S. Ser. No. 10/154,815 to Al-Ali et al., the disclosure of which is incorporated herein by reference. Prophetically a LINCS® TFA-1® sensor available from Masimo Corporation of Irvine, CA is suitable for use as the pulse oximeter 320.

The pulse oximeter 320 may be wired to a readout display or may wirelessly transmit the data to the display in known fashion. The display, the wired transceiver, and/or wireless transceiver form no part of the claimed invention except as may be specifically claimed below. The display is then monitored by the doctor, an anesthesiologist or other member of the surgical staff. Using a pulse oximeter 320 as the functional additive 220 provides the benefit that the patient monitoring, and therefore safety are elevated over prior art techniques.

Figures 12, 13:
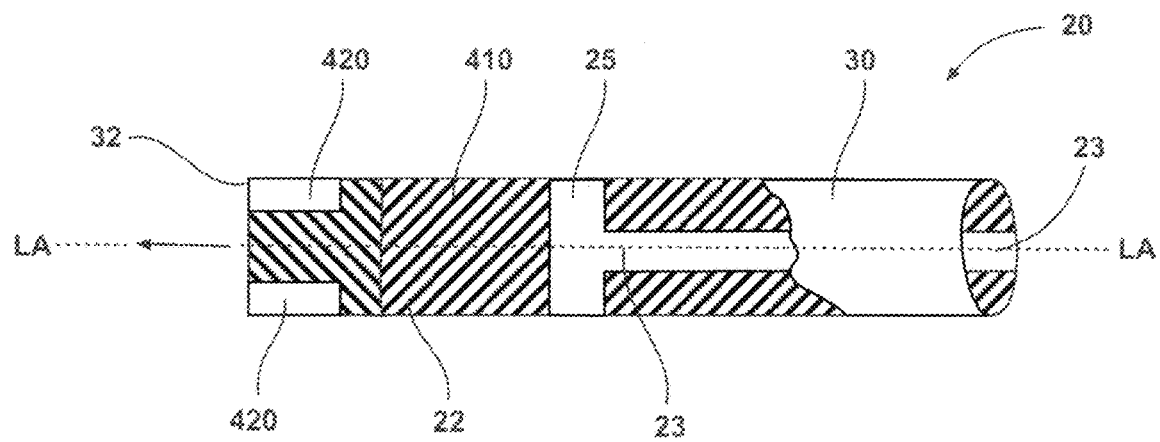
FIG. 12 is a nonlimiting table of functional additives suitable for use with the present invention.
FIG. 13 is a fragmentary side elevational view of an apparatus according to the present invention shown partially in cutaway and having a tampon and deployment tube with separate constituents mixed at the point of use.

Referring to FIG. 12, it can be seen that the tampon 22 may have functional additives 220 which provide various benefits. The functional additive 220 may be selected from the group consisting of or consisting essentially of medication 230, AGM 240, luminescent material 260, temperature change material 280, soluble adhesive 300, a pulse oximeter 320 and combinations thereof. The functional additives 220 may be conceptually grouped as functional additives 220 including medication 230, absorbent gelling material/superabsorbent polymer 240 and endothermic/exothermic materials 280 which provide benefits to the patient. The functional additives 220 may be conceptually grouped as functional additives 220 including luminescent material 260, blood soluble adhesive 300 and pulse oximeters 320 which provide convenience to the doctor for patient care.

Referring to FIG. 13 in another embodiment the apparatus 20 may activate the functional additive 220 at the point of use. This arrangement provides the benefit that the doctor can activate the functional additive 220 at the point of use without requiring additional steps. Furthermore, this arrangement provides the surgeon with more flexibility to use the proper functional additive 220 for a particular patient.

For example, the doctor may select a hydrogel nasal dressing medication 230 as the functional additive 220, particularly, but not exclusively, for nasopharyngeal surgery. A hydrogel nasal dressing medication 230 may be used during or after surgery to inhibit excessive blood clot formation, improve speed of wound epithelialization and improve mucosal functionality. The hydrogel nasal dressing medication 230 typically consists of three main ingredients: chitosan for anti-adhesion and hemostasis; dextran to inhibit coagulation and reduce fibroblast migration and glycerol to retain moisture and control viscosity.

A suitable dissolvable biohydrogel nasal dressing medication 230 comprising chitosan succinamide, glycerol and dextran aldehyde is sold by Medtronic Inc. of Minneapolis, MN under the name Chitogel. Chitogel, and similar medications 230, are typically mixed by a medical assistant at the operating table using predetermined quantities of the three ingredients, as supplied by the manufacturer.

But this arrangement has some notable drawbacks. For example, different patients have vastly different nasopharyngeal and sinus cavity shapes, sizes and depths. One patient may benefit from a higher viscosity hydrogel nasal dressing medication 230 while a lower viscosity hydrogel nasal dressing medication 230 may be more suitable for the next patient. But as the quantities are predetermined by the manufacturer, adjusting viscosity on the fly according to the prior art is generally infeasible.

According to the present invention the tampon 22 may be provided with a first constituent 410 and the apparatus 20 may be provided with a second constituent 420. The second constituent 420 may be disposed inside the deployment tube 30, and particularly be juxtaposed with the distal end 32 thereof. The tampon 22 is placed inside the deployment tube 30, and the constituents 410, 420 are mixed as the tampon 22 is deployed by the doctor at the point of use to yield a reaction that occurs at the point of use and not prior thereto. This arrangement provides the benefit that the constituents 410, 420 can be mixed at the point of use, and advantageously allows for novel use of constituents 410, 420 which cannot be pre-mixed. For example, a dissolvable post-op nasal dressing (intranasal splint) to reduce bleeding, edema and adhesions within the nasal cavity may be employed and have the necessary constituents 410, 420 mixed at the point of use. A suitable dissolvable post-op nasal dressing may comprise dry carboxymethyl cellulose [CMC] which can form a foam or a cushioning hydrocolloid gel upon being wetted. Suitable post-op CMC dressings are sold by Smith+ Nephew of Waterford, UK under the names SINU-FOAM and RAPID RHINO. A first constituent 410 of the medication 230 and may be disposed in the tampon 22 and the other constituent 420 disposed in the deployment tube 30 or elsewhere in the apparatus 20, or vice versa.

In a particular nonlimiting embodiment, the functional additive 220 is a dissolvable biohydrogel nasal dressing medication 230, such as Chitogel, may be arranged as a kit 450. Two first constituents 410, such as the chitosan succinimide, and dextran aldehyde, may be impregnated into the tampon 22. The second constituent 420, such as glycerol, may be disposed in the deployment tube 30 of apparatus 20. The kit 450 comprises one or more tampons 22 and one or more apparatuses 20. The tampon 22 is loaded into the deployment tube 30 of the apparatus 20 for ultimate use by the doctor during the procedure. The apparatus 20 of the kit 450 may be durable for restoration, sanitizing and reuse. The tampon 22 of the kit 450 may be discarded after a single use.

Figure 14:
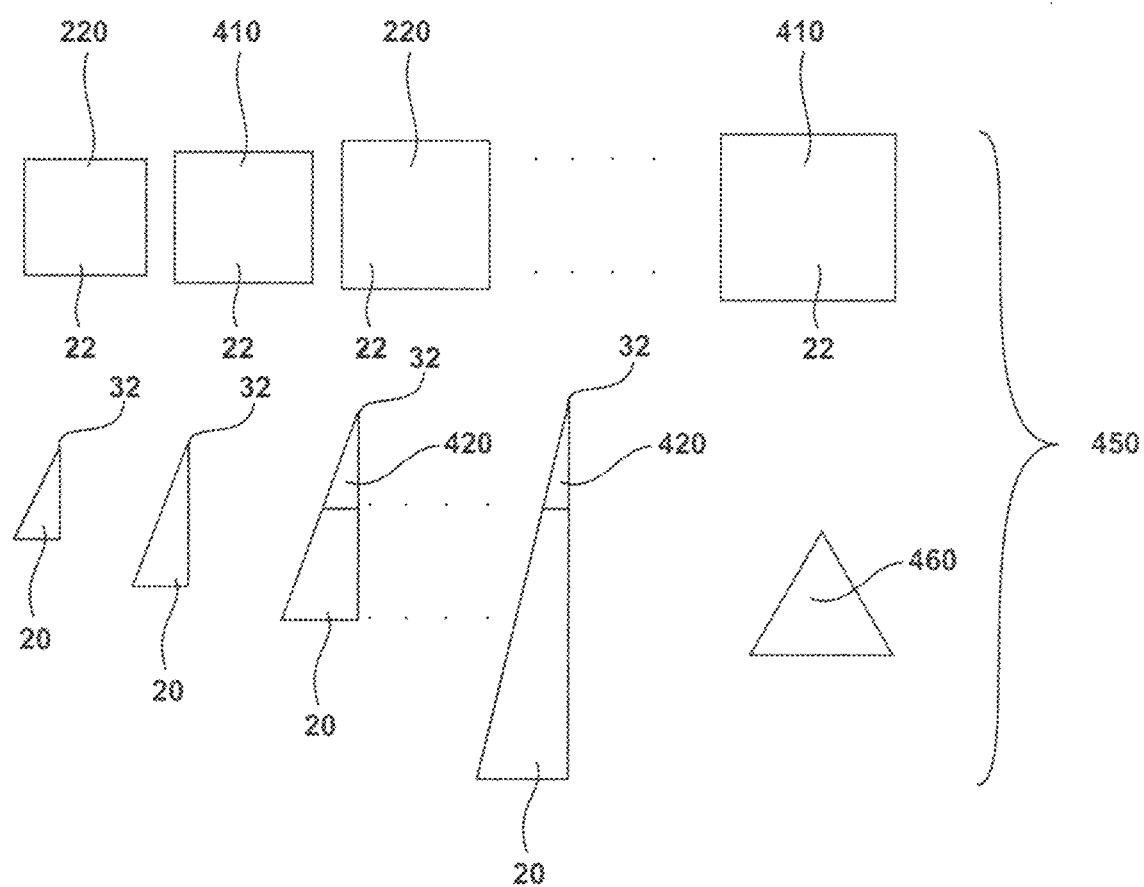
FIG. 14 is a schematic view of a kit according to the present invention.

Referring to FIG. 14, a kit 450 may contain one tampon 22 or contain a plurality of tampons 22, having different sizes and/or different medications 230 or other first constituents 410, as shown. A plurality of tampons 22 provides flexibility for the doctor to select the best tampon 22 for that particular procedure. Likewise the kit 450 may contain one apparatus 20 or a plurality of apparatuses 20. A plurality of apparatuses 20 provides the benefit that each apparatus 20 may be loaded with different second constituents 420. The doctor may select the best apparatus 20 to pair with a particular tampon 22 for the particular procedure and patient under consideration.

Preferably the kit 450 contains instructions 460 for use during surgery, including without limitation otolarngological and/or nasopharyngeal surgery. The instructions 460 may specify the doctor should particularly discard the tampon 22 after a single use and may further contain instructions 460 that the functional additive 220 is only intended for single use. Preferably the kit 450 also contains instructions 460 to cleanse, sanitize and repackage the hardware comprising the apparatus 20 under sterile conditions, collectively referred to as 'restoring' the apparatus 20 of the hardware. The instructions 460 may be printed on paper and included with the kit 450 as presented to the doctor or medical facility, may be posted online on a website associated with the kit 450, contained in professional literature and/or permanently affixed to the packaging containing the kit 450.

In an advantageous nonlimiting example, the kit 450 may comprise a single tampon 22 impregnated with a predetermined dose of first constituents 410 chitosan succinimide, and dextran aldehyde. The kit 450 may further comprise a plurality of apparatuses 20 loaded with mutually different doses of a glycerol second constituent 420. At the point of use, the doctor can select the apparatus 20 having the desired dose size of glycerol for the particular patient. As the second constituent 420 dose of glycerol increases, holding the first constituent 410 dose of chitosan succinimide, and dextran aldehyde constant, the dynamic viscosity of the dissolvable biohydrogel nasal dressing medication 230 mixture administered to the patient increases. Such a kit 450 advantageously provides the doctor with the flexibility to select a particular apparatus 20 from the kit 450 in order to provide the desired ultimate viscosity as needed for that particular patient's anatomy. The glycerol can also be used to control the density (directly proportional to glycerol dose) and specific heat/thermal conductivity (inversely proportional to the glycerol dose) of the dissolvable biohydrogel nasal dressing medication 230. Thus for one patient benefitting from a higher viscosity dissolvable biohydrogel nasal dressing medication 230 the doctor may select an apparatus 20 from the kit 450 having a larger glycerol dose, or for another patient benefitting from a lower viscosity dissolvable biohydrogel nasal dressing medication 230 the doctor may select an apparatus 20 from the kit 450 having a smaller glycerol dose. An exemplary kit 450 may have 1-12 tampons 22 and 1-3 apparatuses 20.

Figure 15:
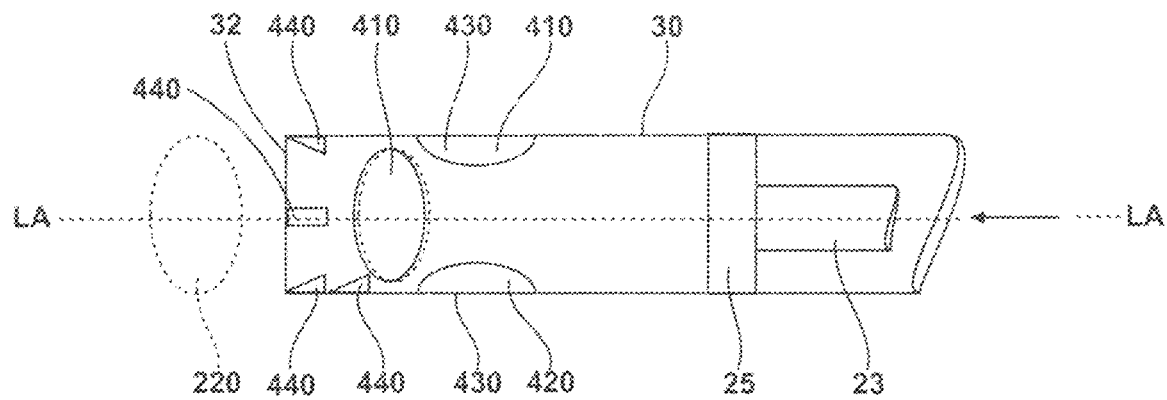
FIG. 15 is a fragmentary side sectional view of a deployment tube having pouches with different constituents therein.

Referring to FIG. 15, in another embodiment, a first constituent 410 and second constituent 420 may both be loaded into the deployment tube 30 of the apparatus 20. But it may be desired to keep the first and second constituents 410, 420 separated until the point of use to avoid intermixing and premature chemical reaction. Upon mixing after ejection from the deployment tube the constituents 410, 420 intermix at the point of use to form a functional additive 220.

In such an embodiment, the first constituent 410 may be disposed in the barrel of the deployment tube 30, proximate the distal end 32 thereof. The second constituent 420 may be disposed in one or more discrete and impermeable pouches 430. The pouches 430 may have a shell construction. The shell may be made of a thin polyolefinic film, such as LDPE, cellulose, water soluble polysaccharide such as pullulan, starch, etc. Internal to the shell of the pouch 430 is a functional additive 220, as described herein. The functional additive 220 may be liquid, gelatinous, granular, a solid, etc. The pouches 430 are also disposed internal to the deployment tube 30 distal of the plate 25. The pouches 430 may be frangible and have one or more lines of weakness, such as thinned areas or impermeable perforations, to promote preferential tearing.

One or more radially oriented barbs 440 are disposed internal to the deployment tube 30 distal of the pouches 430. The barbs 440 may be of equal or unequal size and/or shape. The barbs 440 may be circumferentially aligned or the barbs 440 may be offset in the longitudinal direction. The barbs 440 may be registered with the lines of weakness in the frangible pouches 430. As the plunger 23 advances, the plate 25 pushes the pouches 430 containing the second constituent 420 towards the radial barbs 440. As the pouches 430 longitudinally traverse the barbs 440, the pouches 430 rip open, releasing the second constituent 420 to mix with the first constituent 410. The first and second constituents 410, 420 are then mixed at the point of use under the influence of the advance of the plunger 23.

Furthermore, the pouches 430 of the present invention provide versatility not previously known to be used in the operating room. For example, a first pouch 430 may comprise a first combination of medications 230 while a second pouch 430 may comprise a second combination of medications 230, etc. By way of hypothetical, nonlimiting example, the pouches 430 may comprise a common medication 230 having two constituents 410, 420 in different proportions. By way of nonlimiting example, the medication 230 may include a first pouch 430 comprising two constituents 410, 420 in a 35/65 ratio, a second pouch 430 may comprise the same medication 230 having the same two constituents 410, 420 in a 50/50 ratio and a third pouch 430 may comprise the same medication 230 having the same two constituents 410, 420 in a 65/35 ratio, etc. This embodiment provides the doctor the flexibility to select the optimal medication 230 for that particular patient at that point during the procedure. This embodiment also provides the benefit that errors in the operating room can be reduced while medications 230, such as Chitogel, are being prepared.

Figure 16:
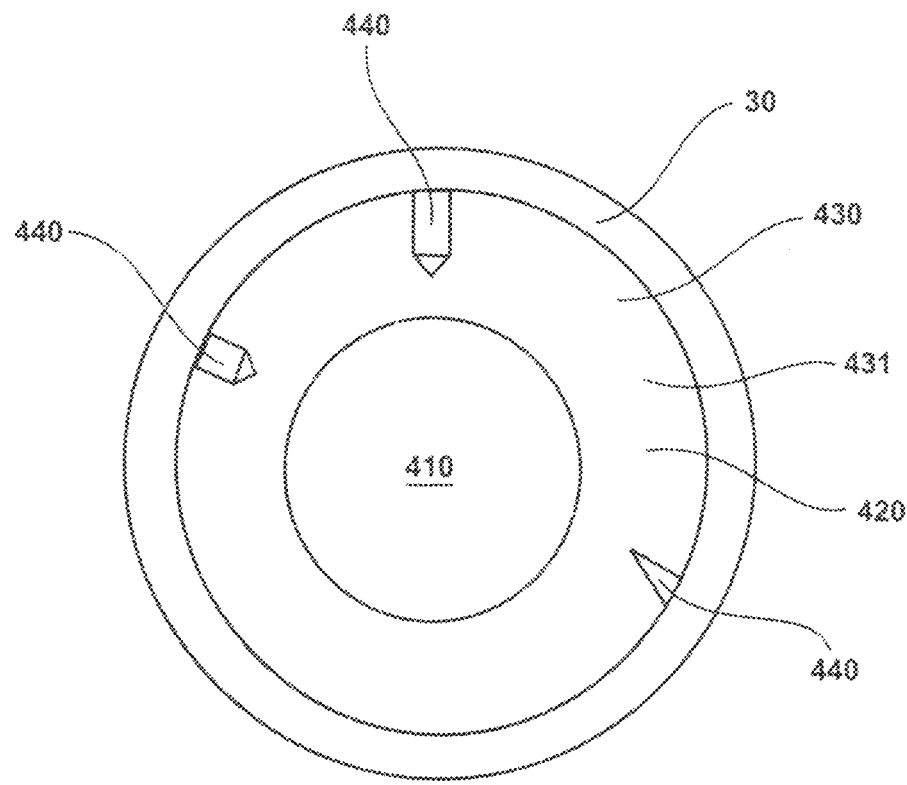
FIG. 16 is a scale frontal view of a deployment tube having annularly disposed separate constituents therein.

Referring to FIG. 16, in a particular embodiment the pouch 430 may comprise an annulus 431 containing the second constituent 420. The first constituent 410 may be in the center of the annular pouch 430. As the plate 25 longitudinally advances, the radially orient barbs 440 intercept the pouch 430, ripping it open to thereby intermix the second constituent 420 previously contained therein with the first constituent 410 in the center of the annulus 431. Alternatively, or additionally, the one or more barbs 440 may have a spiral configuration to prophetically promote intermixing of constituents 410, 420 in the functional additive 220. The barbs 440 may be equally circumferentially spaced or unequally circumferentially spaced as shown. The barbs 440 may have equal radial projection or unequal radial projection, as shown.

The pouches 430 provide the benefit that being premixed with two or more constituents 410, 420 saves time in the operating room, reduces human error and minimizes spillage. While a pouch 430 having two constituents 410, 420 in an annular configuration is shown, one of skill will recognize the invention is not so limited. Any numbers of constituents 410, 420 may be used in any desired configuration or mixture. Furthermore at least one of the constituents 410, 420 may be granular and mixed with a liquid constituent 410, 420 to yield a farinaceous medication 230.

Figure 17:
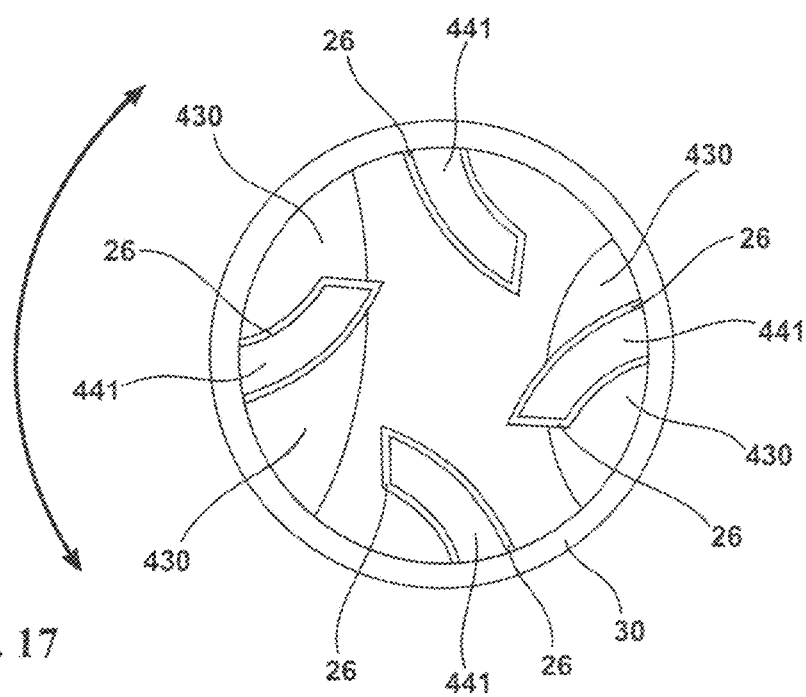
FIG. 17 is an instantaneous frontal view of a deployment tube having four vanes engaging two pouches and the tampon omitted for clarity.
Figure 18:
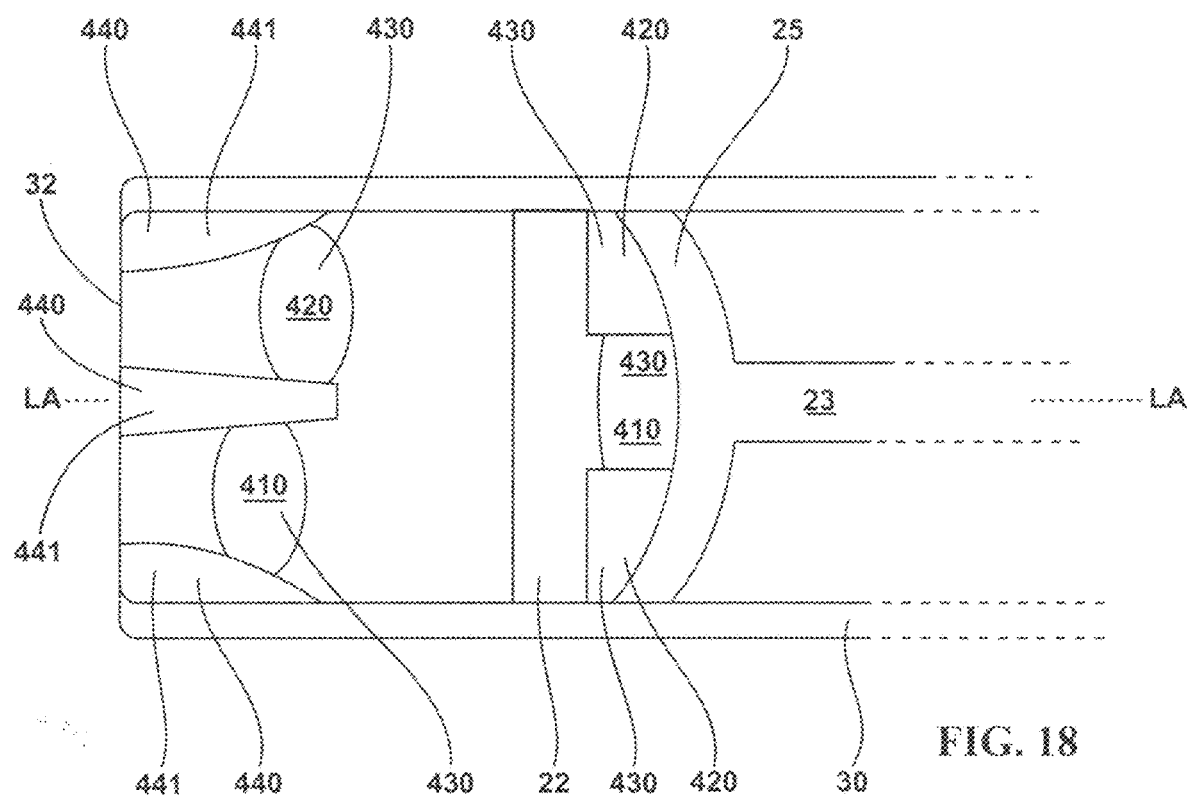
FIG. 18 is a scale instantaneous fragmentary side elevational sectional view of deployment tube having both free floating pouches of constituents and annular pouches of constituents.

Referring to FIG. 17 and FIG. 18, in another embodiment the deployment tube 30 may contain spiral or helical vanes 441 oriented to be registered with the peripheral notches 26 of the plate 25 and cantilevered from the inner wall of the deployment tube 30. Such a plate 25 may be configured to be axially rotatable on the plunger 23. By axially rotatable, it is meant that the plate 25 is rotatable about the longitudinal axis LA of the deployment tube 30 in the direction of the arrow. As the axially rotatable plate 25 rotates in response to advance of the plunger 23, intermixing of any constituents 410, 420 distal of the plate 25 will prophetically occur. Prophetically, the notches 26 may be of complementary shape and may intercept and follow the helical vanes 441, promoting the circumferential rotation of the plate 25. Optionally the plate 25 may have a concave face for placement of the second constituent 420 or pouch 430. Prophetically, such vanes 441 will function as a helical static mixer.

This embodiment is judged to be useful for surgery in the back of the throat. For an adult human patient, the deployment tube 30 may have an OD of at least about 0.8 cm and less than about 3 cm, preferably less than about 2 cm and more preferably less than about 1.5 cm.

One of skill will recognize that the apparatus 20 of the present invention may comprise both free floating pouches 430 containing the constituents 410, 420 and annular/concentric pouches 430 containing the constituents 410, 420. The tampon 22 may be distal of the pouches 430, proximal of the pouches 430 or intermediate the pouches 430, as desired.

While an execution with four vanes 441 and four notches 26 and is shown, one of skill will recognize the invention is not so limited. The apparatus 20 may use a plate 25 with any reasonable number, prophetically ranging from 1 to 10 holes 26 and/or notches 26 and/or vanes 441. The functional additive 220 may have any plurality of constituents 410, 420. The tampon 22 may have any number of compatible functional additives 220. While much of the disclosure above related to a nasopharyngeal tampon 22, one of skill will recognize such discussion is further applicable to any surgical tampon 22, particularly a surgical tampon 22 suitable for other ear, nose and throat surgeries. Other variations, combinations and permutations of the apparatus 20, tampon 22 and functional additives 220 described herein are envisioned and only limited by the attached claims.

Collectively, the at least one barb 440, the at least one vane 441 coupled with a complementary notch 26 and/or a tapered deployment tube 30 are referred to herein as a constricted cross section for rupturing the pouch 430 all operating on the principle of reducing the cross section of the deployment tube 30 near the distal end 32 to disrupt and open the shell of the pouch(s) 430 at or near the distal end 32 for expulsion into the patient as desired by the doctor. The constricted cross section is small enough and/or sufficiently irregular due to the barb(s) 440, vane(s) 441 and/or convergent tapering of the hollow deployment tube 30 to cause rupture of a pouch 430 moving through the constricted region under the influence of the plunger 23.

The pouch 430 may have one or more lines of weakness, as is known in the art, to promote rupture upon extrusion through the deployment tube 30. As used herein, rupture of the pouch 430 includes tearing, dissolution, and expression of the functional additive 220 through the shell due to compressive pressure applied to the pouch 430.

Figure 19:
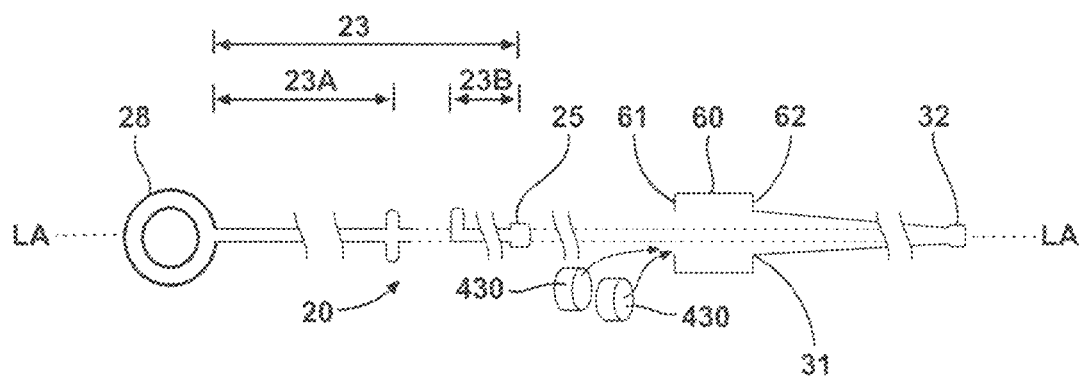
FIG. 19 is a broken schematic exploded sectional view of an apparatus having a withdrawn plunger and two pouches for disposal into the housing in the direction of the arrows.

Referring to FIG. 19, in another embodiment, the plunger 23 may be withdrawn from the apparatus 20 by retraction through the proximal end 61 of the housing 60. Upon removal of the plunger 23 from the apparatus 20, at least one pouch 430 containing a functional additive 220 may be inserted into the proximal end 61 of the housing 60. The pouches 430 may have mutually identical functional additives 220 or have different functional additives 220. This embodiment may be used without the tampon 22 or may optionally be used with the tampon 22.

Upon insertion of at least one pouch 430 into the housing 60, the plunger 23 is reinserted into the housing 60. The plunger 23 is then protracted so that the plate 25 intercepts the at least one pouch 430 and pushes the pouch 430 from the housing 60 to the proximal end 31 of the deployment tube 30 and through the deployment tube 30 towards the distal end 32 thereof. At that time the apparatus 20 is ready for use by the doctor. This embodiment provides the benefit that upon removal of the plunger 23 from the housing 60, the plunger 23 can be inspected for kinks, twists and other mechanical problems.

In use, the doctor disposes the distal end 32 of the deployment tube 30 at the desired site within the anatomical cavity of patient. The doctor then advances the plunger 23, optionally using the grip 28. The at least one pouch(s) 430 are extruded throughout the length of the deployment tube 30. The at least one pouch 430 may rupture due to the extrusion or may rupture upon intercepting the barbs 440, thereby releasing the functional additive 220. Optionally, vanes 441 may be used to mix plural additives 220 and/or promote rupture of the pouches 430. Further advance of the plunger 23 causes the plate 25 to expel the functional additive 220 at the desired site within the patient. The apparatus 20 may then be withdrawn from the patient to be restored or discarded.

The plunger 23 may be integral or may comprise two releasably joinable segments 23A, 23B releasably connected by a bayonet fitting 23C. The bayonet fitting 23C may be juxtaposable with the abutment between the distal end 62 of the housing 60 and proximal end 61 of the housing 60. This arrangement provides the benefit of convenient assembly and interchangeability of parts. Alternatively, the plunger 23 may have an integral construction. If a tapered deployment tube 30 is selected, the plate 25 should be sized to fit to the distal end 32 thereof, to ensure the pouch 430 and more particularly the functional additive 220 previously contained within the pouch 430 is extruded through the deployment tube 30 and into the desired location within the anatomical cavity of the patient.

Figure 20:
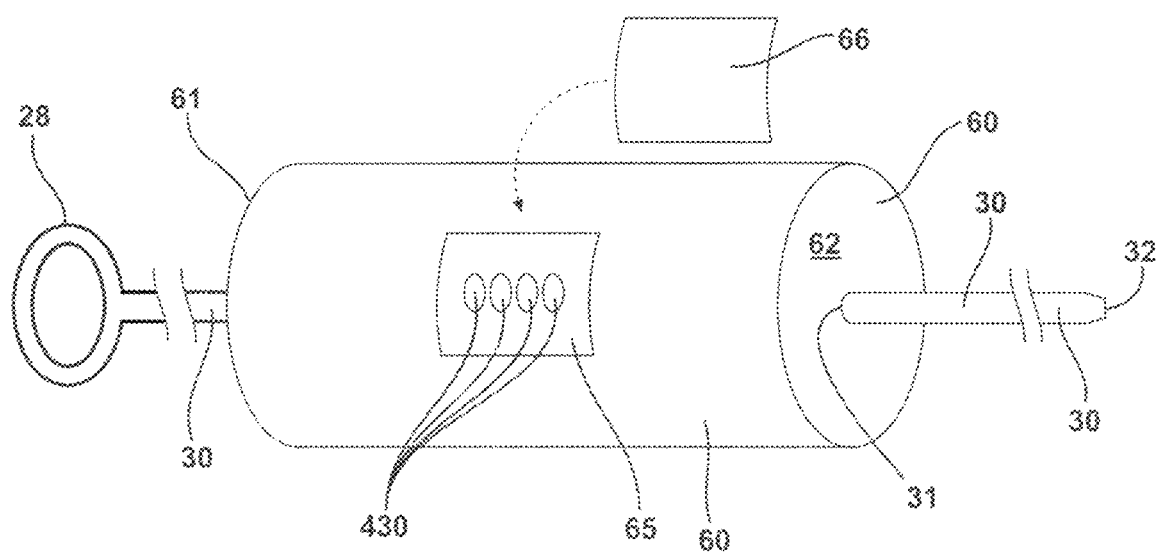
FIG. 20 is a schematic perspective view of an apparatus having a port with an openable cover and a plurality of pouches in the housing.

Referring to FIG. 20, in another embodiment, the housing 60 may have a port 65 in the side thereof. The port 65 allows access to the inside of the housing 60 without removal of the plunger 23. The plunger 23 is retracted until the plate 25 is proximal of the port 65. Then at least one pouch 430 containing a functional additive 220 is inserted through the port 65 into the housing 60. The pouches 430 may have mutually identical functional additives 220 or have different functional additives 220. This embodiment may be used without the tampon 22 or may optionally be used with the tampon 22. This embodiment provides the benefit that the plunger 23 and housing 60 are never separated, minimizing lost or misplaced parts.

The port 65 may optionally have a removable closure 66. The removable closure 66 may be hingedly attached to the outside of the housing 60 or may be removably attached to the housing 60 in known fashion using standard clips. The closure 66 provides the benefit that sterility inside the housing 60 can be maintained and the chance for the pouches 430 to fall out before the plate 25 is advanced forward and distal of the port 65 is minimized.

Again, in use, the doctor disposes the distal end 32 of the deployment tube 30 at the desired site within the anatomical cavity of patient. The distal end 32 may taper to a nozzle geometry. The doctor then protracts the plunger 23, optionally using the grip 28. The at least one pouch(s) 430 are extruded throughout the length of the deployment tube 30. The at least one pouch 430 may rupture due to the extrusion or may rupture upon intercepting the barbs 440, thereby releasing the functional additive 220. Optionally, vanes 441 may be used to mix plural additives 220 and/or promote rupture of the pouches 430. Further advance of the plunger 23 causes the plate 25 to expel the functional additive 220 at the desired site within the anatomical cavity of patient. The apparatus 20 may then be withdrawn from the patient to be restored or discarded.

The apparatus 20 of the present invention, and any component parts, may be made using 3D printing/additive manufacturing including any of vat photopolymerisation, material extrusion, material jetting, binder jetting, powder bed fusion, directed energy deposition and/or sheet lamination as may be desired and feasible for the particular apparatus 20 under consideration.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa. While particular embodiments of the present invention have been illustrated and described, it would be obvious to those skilled in the art that various other changes and modifications can be made without departing from the spirit and scope of the invention. It is therefore intended the appended claims cover all such changes and modifications that are within the scope of this invention.

What is claimed is:

1. A conformable nasopharyngeal tampon for disposition into and removal from an anatomical cavity of a mammalian patient, the tampon comprising:
   an absorbent chassis material having two or more polygonal portions, each polygon portion having defined faces; and
   a plurality of spaced apart positioning strings attached to the absorbent chassis material, where each positioning string is attached to a respective polygonal portion of the two or more polygonal portions and the positioning strings are operative to selectively position the tampon within an anatomical cavity of a patient responsive to manipulation of the positioning strings.

2. The tampon according to claim 1, further comprising an indicium disposed on each of the positioning strings, whereby each of the positioning strings are mutually distinguished by the indicium.

3. The tampon according to claim 2, where the indicium is a visual indicium.

4. The tampon according to claim 1, the two or more polygonal portions of the tampon including four quadrants, and a positioning string of the plurality of spaced apart positioning strings attached to each one of the four quadrants.

5. The tampon according to claim 1, the tampon divisible into at least a front bisection and a rear bisection, the front bisection selectively detachable from the rear bisection via manipulation of one or more of the positioning strings.

6. The tampon according to claim 5, where each of the positioning strings comprises a mutually distinguishable indicium.

7. The tampon according to claim 1, where the two or more polygonal portions include one or more of parallelopiped and triangular portions.

8. A compressible tampon configured for disposal into and removal from an anatomical cavity of a patient, the tampon comprising:
   an absorbent material having a first uncompressed volume and suitable for being compressed to a second volume less than the first volume when disposed in a hollow deployment tube and returning to the first volume upon expulsion from such a deployment tube, the tampon being sized for insertion into the nasopharyngeal region of a human patient and having a plurality of spaced apart positioning strings attached to the tampon, whereby manipulation of one or more strings of said plurality of spaced apart positioning strings positions the tampon while disposed in the anatomical cavity of the patient,
   the absorbent material having two or more polygonal portions, each polygon portion having defined faces, where each positioning string is attached to a respective polygonal portion of the two or more polygonal portions.

9. The tampon according to claim 8, the tampon having an exterior surface and further comprising an impermeable barrier disposed on at least a portion of the exterior surface.

10. The tampon according to claim 8, the tampon further comprising at least one functional additive.

11. The tampon according to claim 10, wherein the functional additive is selected from the group consisting of: a medication, an absorbent gelling material, a luminescent material, an exothermic material, an endothermic material, a pulse oximeter, and combinations thereof.

12. The tampon according to claim 8, the tampon having from three to six spaced apart positioning strings.

13. The tampon according to claim 8, disposed in a hollow longitudinally extending deployment tube having opposed proximal and distal ends, the tampon being proximate the distal end of the deployment tube and expellable therefrom responsive to manipulation.

14. The tampon according to claim 8, the tampon further comprising two or more passages therein for receiving a complementary suction tube, the suction tube having two or more corresponding branches for applying suction and a confluence where the branches are joined into a single main portion connectable to a suction source configured to remove bodily fluids from the patient.

15. The tampon according to claim 8, the tampon having at least a first bisection as a first polygonal portion and a second bisection as a second polygonal portion, the first bisection selectively detachable from the second bisection via manipulation of one or more of the positioning strings.

16. The tampon according to claim 15, further comprising an indicium disposed on each string of the plurality of spaced apart positioning strings, whereby each string is mutually distinguished by the indicium.

17. The tampon according to claim 16, the absorbent material comprising a first zone and a second zone defined by mutually different properties of one or more of density and hydrophilicity.

18. The tampon according to claim 17, where the first bisection comprising the first zone and the second bisection comprising the second zone.

19. The tampon according to claim 18, where the first bisection has a lesser density than the second bisection.

20. The tampon according to claim 19, where the second bisection comprises a diagnostic or therapeutic medication.

21. The tampon according to claim 15, the tampon disposed in a kit containing a plurality of mutually different tampons.

22. The tampon according to claim 8, where the two or more polygonal portions include one or more of parallelopiped and triangular portions.

* * * * *